United States Patent [19]

Beall et al.

[11] 4,297,139
[45] Oct. 27, 1981

[54] INORGANIC GELS AND CERAMIC PAPERS, FILMS, FIBERS, BOARDS, AND COATINGS MADE THEREFROM

[75] Inventors: George H. Beall, Big Flats; David G. Grossman, Corning; Syed N. Hoda, Horseheads; Karen R. Kubinski, Elmira Heights, all of N.Y.

[73] Assignee: Corning Glass Works, Corning, N.Y.

[21] Appl. No.: 162,764

[22] Filed: Jun. 25, 1980

Related U.S. Application Data

[62] Division of Ser. No. 23,907, Mar. 26, 1979, Pat. No. 4,239,519.

[51] Int. Cl.³ .................................................... C03C 3/22
[52] U.S. Cl. ............................................ 501/2; 106/74; 106/DIG. 3; 501/4; 501/151
[58] Field of Search ............... 106/39.6, 74, DIG. 3, 106/39.7; 252/309, 313 R, 307

[56] References Cited

U.S. PATENT DOCUMENTS

| | | | |
|---|---|---|---|
| 3,586,478 | 6/1971 | Neumann | 252/317 |
| 3,936,383 | 2/1976 | Daimon et al. | 106/74 |
| 3,985,531 | 10/1976 | Grossman | 65/33 |
| 3,985,534 | 10/1976 | Flannery et al. | 65/33 |
| 4,045,241 | 8/1977 | Daimon et al. | 106/DIG. 3 |
| 4,067,819 | 1/1978 | Daimon et al. | 106/DIG. 3 |

*Primary Examiner*—James Poer
*Attorney, Agent, or Firm*—Clinton S. Janes, Jr.

[57] ABSTRACT

The present invention is related to the production of crystal-containing gels and papers, films, fibers, boards, and coatings made therefrom. The process for making the gels comprises three general steps: first, a fully or predominantly crystalline body is formed containing crystals consisting essentially of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite; second, that body is contacted with a polar liquid, desirably water, to cause swelling and disintegration of the body accompanied with the formation of a gel; and, third, the solid:liquid ratio of the gel is adjusted to a desired value depending upon the application therefor. Where papers, films, fibers, boards, or coatings are desired, such are prepared from the gel, and, to impart good chemical durability thereto, are thereafter contacted with a source of large cations to effect an ion exchange reaction between the large cations and the $Li^+$ and/or $Na^+$ ions from the interlayer of the crystals, and the products then dried. Glass-ceramic bodies are the preferred starting materials.

9 Claims, 8 Drawing Figures

INORGANIC GELS AND CERAMIC PAPERS, FILMS, FIBERS, BOARDS, AND COATINGS MADE THEREFROM

This is a division, of application Ser. No. 23,907, filed Mar. 26, 1979, now U.S. Pat. No. 4,239,519.

BACKGROUND OF THE INVENTION

Paper-like products have been manufactured from various inorganic materials for a number of years. Most commonly, the starting ingredients for such products have comprised either asbestos or fibrous forms of alumina, basalt, glass, wollastonite, zirconia, etc., bonded together with an inorganic or organic binder. Less frequently, flake-like minerals such as bentonite, mica, and vermiculite have been employed as the papermaking element or as fillers in other papers. None of the papers so produced, however, has exhibited the smoothness, the flexibility, and the mechanical strength of a conventional wood pulp paper, particularly a paper containing a substantial rag content. Such deficiencies have limited the use of inorganic papers to applications where those characteristics are less important, e.g., in thermal and electrical insulation, filtration, and chromatography. Nevertheless, because of the other very desirable properties demonstrated by inorganic papers, especially the electrical and thermal insulating characteristics and the resistance to weathering and chemical attack exhibited by micaceous papers, research has continued to develop ever better inorganic papers. The primary goal of this research has been to develop inorganic papers which retain the desirable chemical and physical properties of the commercially-available inorganic papers, but which would display the smoothness, flexibility, and mechanical strength of conventional wood pulp paper. Board can be made through the stacking of sheets or fragments of paper.

Micas belong to the sheet-silicate group of minerals. Sheet silicates of the mica type are built of two units, viz., a tetrahedral sheet and an octahedral sheet. The former consists of tetrahedra of Si-O linked together to form a hexagonal network such that the bases thereof are coplanar and the apices thereof point in the same direction. This configuration yields a Si:O ratio of 2:5. In contrast, the octahedral sheet is generated through the impingement of two tetrahedral sheets pointing toward each other and crosslinked by the sharing of oxygens by Mg (or Al,Fe) in octahedral coordination. The two octahedral corners not falling in the plane of apical oxygens are occupied by hydroxyl or fluoride ions. It is possible that a composite sheet formed in this manner will be electrically neutral, in which case Van der Waals-type forces bond it to the sheets immediately above and below. More commonly, however, an excess negative charge exists due either to ion substitutions or unoccupied sites (vacancies) or a combination of both. Differences in properties arise both from the degree of charge deficiency as well as the location of the excess charge. Charge balance is restored through the uptake of foreign cations in interlayer positions in 12-fold coordination due to hexagonal rings of oxygens located in the sheets above and below. The structural formula of the resulting species can be generalized as $$X^{XII}_{0-1} Y^{VI}_{2-3} Z^{IV}_4 O_{10}(F,OH)_2$$

wherein the Roman numerals refer to ligands surrounding the cations and X, Y, and Z represent cations in the superscripted coordination, their nature being as follows:

| Cation | Cation Radius | Illustrative Examples |
|---|---|---|
| X | >0.6Å | Li, Na, K, Ca, Sr, Ba, Pb, NH$_4$, Rb, Cs |
| Y | 0.5–0.8 | Mg, Al, Li, Mn, Fe, Zn, Cu, Ni, Co |
| Z | 0.3–0.6Å | Si, Al, B, P, Ge, Be, possibly Mg |

Glass-ceramic articles wherein the predominant crystal phase consists of a fluormica are well known to the art. Glass-ceramic articles are commonly highly crystalline, i.e., greater than 50% by volume crystalline, and, because such are derived via the controlled thermal crystallization of precursor glass bodies, the crystals developed therein can be very uniform in size. Moreover, because glass constitutes the parent of a glass-ceramic, the many forming techniques utilized in glass manufacture are equally appropriate in the production of glass-ceramics.

Two basic methods for preparing glass-ceramic articles have been disclosed. The first and most generally used process dates to U.S. Pat. No. 2,920,971, the initial patent in the field of glass-ceramics. As outlined therein, the method comprehends three overall steps. First, a glass-forming batch, normally containing a nucleating agent, is melted. Second, the melt is simultaneously cooled to a glass and an article of a desired geometry shaped therefrom. Third, the glass article is subjected to a particularly-defined heat treatment to cause in situ crystallization of the glass. In the preferred practice, the heat treatment is customarily divided into two elements. Thus, the glass article will initially be heated to a temperature within the transformation range or somewhat thereabove to initiate nucleation, following which the nucleated article will be heated to still high temperatures, frequently in excess of the glass softening point, to cause the growth of crystals on the nuclei. Further information regarding the physical characteristics of such glass-ceramics and their means of production can be obtained from a study of U.S. Pat. No. 2,920,971 and U.S. Pat. Nos. 3,689,293, 3,732,087 and 3,756,838 which disclose the manufacture of that type of glass-ceramic wherein a fluormica constitutes the predominant crystal phase.

More recently, glass-ceramic bodies have been prepared from certain compositions through the controlled cooling of a glass melt. The process contemplates four basic steps. First, a glass-forming batch, optionally containing a nucleating agent, is melted. Second, the melt is simultaneously cooled to a temperature within the range of about 100°–300° C. above the annealing point of the glass to cause phase separation and nucleation to take place and a glass body is shaped therefrom. Third, the glass body is exposed to a temperature between the annealing point of the glass and the temperature of phase separation and nucleation to cause the growth of crystals on the nuclei. Fourth, the crystallized body is cooled to room temperature. Products made in accordance with this method have been termed "spontaneous glass-ceramics", Additional information with reference to the physical characteristics of such glass-ceramics and the method of production therefor can be secured from a study of U.S. Pat. Nos. 3,985,531 and 3,985,534 which describe the production of that type of glass-ceramic wherein a fluormica comprises the predominant crystal phase.

SUMMARY OF THE INVENTION

Figure 1:
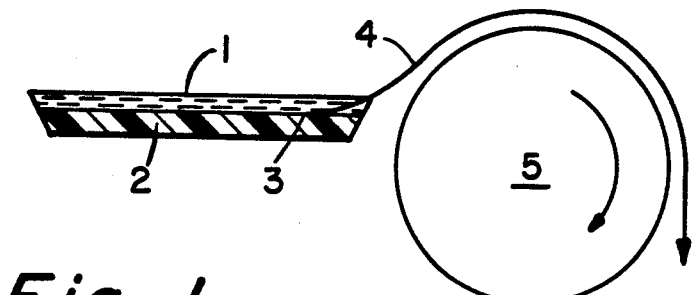
FIG. 1 is a schematic representation of an apparatus suitable for continuously drawing a film according to an embodiment of the inventive process.

We have found that inorganic films, fibers, and paper, the paper exhibiting the smoothness, flexibility, and mechanical strength approaching those of conventional, better-quality wood pulp paper, while retaining the physical and chemical characteristics intrinsic to mica and mica-like materials, can be achieved following six general steps:

First, a fully or predominantly crystalline body is formed containing basically a lithium and/or sodium water-swelling mica selected from the group of fluorhectorite [$XMg_2LiSi_4O_{10}F_2$], hydroxyl hectorite [$XMg_2LiSi_4O_{10}(OH)_2$], boron fluorphlogopite [$XMg_3BSi_3O_{10}F_2$], hydroxyl boron phlogopite [$XMg_2BSi_3O_{10}(OH)_2$], and solid solutions among those and between those and other structurally-compatible species selected from the group of talc [$Mg_3Si_4O_{10}(OH)_2$], fluortalc [$Mg_3Si_4O_{10}F_2$], polylithionite [$XLi_2AlSi_4O_{10}(OH)_2$], fluorpolylithionite [$XLi_2AlSi_4O_{10}F_2$], phlogopite [$XMg_3AlSi_3O_{10}(OH)_2$], and fluorphlogopite [$XMg_3AlSi_3O_{10}F_2$], wherein X represents the interlayer cation which is $Li^+$ and/or $Na^+$.

Second, the said body is contacted with water or other polar liquid, commonly through immersion therein, and this contact is maintained for a sufficient length of time to cause spontaneous swelling and disintegration of the body into finely-divided particles accompanied with gelation of the particles;

Third, the solid:liquid ratio of the gel is adjusted by dilution or evaporation to achieve a desired fluidity;

Fourth, a thin film or a fiber of the gel is prepared; and, to impart good chemical durability to the film or fiber, then Fifth, the film or fiber is contacted with a source of large cations for a time sufficient to cause an ion exchange reaction to occur between said large cations and the $Li^+$ and/or $Na^+$ ions from the interlayer of said crystals;

Sixth, the film or fiber is dried.

The flow properties, i.e., the viscosity, of the gel can be modified and/or controlled through the optional addition of known deflocculating or peptizing agents such as sodium silicate and sodium pyrophosphate. Also, as will be explained hereinafter, a dried film or fiber prior to the ion exchange reaction swells and disintegrates in water. Thus, paper or board prepared therefrom are also subject to attack by ambient moisture.

Depending upon thickness, the dried film can be considered to be paper. Where desired, several layers of films may be deposited one upon another and the composite then dried, with pressing, if desired, to form board.

Accordingly, the fundamental feature undergirding this embodiment of the present invention is the formation of a gel and the characteristics of that gel. Thus, once a gel has been prepared there are several methods by which a paper or fiber can be made therefrom. However, two facets of the starting materials are vital to the production of good quality paper and fiber: (a) the initial body must contain a substantial quantity of a lithium and/or sodium water-swelling mica selected from the group of fluorhectorite, hydroxyl hectorite, boron fluorphlogopite, hydroxyl boron phlogopite, and solid solutions among those materials; and (b) the body must spontaneously swell and disintegrate into finely-divided particles when contacted with water or other polar liquid and form a gel.

Times as brief as one hour at room temperature may be sufficient for substantial gelation but, commonly, times on the order of 24–48 hours will be required. Periodic agitation and increased temperatures can expedite gelation.

Inorganic gels have been utilized as base materials for such varied applications as cosmetics, emollients, abrasives, and greases. The solid:liquid ratio in such products must necessarily depend upon the application. Furthermore, in many instances inert fillers will be incorporated into the gel. Again, the identity of such fillers is determined by the application to which the gel is to be used. Clays, barite, gypsum, talc, graphite, and organic polymers have been frequent additives. The total solids, i.e., the solids portion of the gel plus any additive, may constitute up to 95% by volume of the product.

The type of crystalline body preferred as the precursor material for this invention is a glass-ceramic of high crystallinity wherein at least a substantial proportion of the crystal phase consists of a lithium and/or sodium water-swelling mica selected from the group of fluorhectorite, hydroxyl hectorite, boron fluorphlogopite, hydroxyl boron phlogopite, and solid solutions among those crystals. A glass-ceramic body is most desirable as the starting material because of the relative uniformity in size of the crystals present therein. The basic steps for making a gel, however, will be the same whatever material constitutes the starting body. For example, in the instance of a glass-ceramic formed in the conventional manner, the steps include:

(a) melting a batch having the necessary components in the proper stoichiometry to secure a lithium and/or sodium water-swelling mica selected from the group of fluorhectorite, hydroxyl hectorite, boron fluorphlogopite, hydroxyl boron phlogopite, and a solid solution among those crystals;

(b) simultaneously cooling the melt to a temperature at least within the transformation range thereof and, commonly, below the transformation range and forming a glass article therefrom;

(c) heat treating the glass articles between about 700°–1200° C. to develop crystals therein; and (d) exposing the glass-ceramic materials to water or other polar liquid (e.g., acetone, methyl ethyl ketone, ethyl alcohol, ethylene glycol, etc.) to cause swelling and breakdown of the material and, most usually, self-gelation.

The size and identity of the crystals developed are a function of the heat treatment applied to the parent glass as well as, of course, a function of the glass composition. Whereas the best papers with respect to strength and flexibility appear to result where the sole crystal phase is chosen from one or more of the previously-mentioned lithium and/or sodium water-swelling mica phases, very acceptable papers and fibers have been produced where crystals in addition to a lithium and/or sodium water-swelling mica phase have been observed in the starting materials. Moreover, in accordance with standard gel, film, and paper making practices, conventional fillers such as clays, glass fibers, talc, natural fibers, organic polymers, etc., which are relatively inert to the gelation and flocculation steps can be added to impart various properties to the gels, films, papers, and boards. Nevertheless, as will be explained hereinafter, the morphology of the lithium and/or sodium water-swelling mica crystal is believed to be of significance in securing good paper and fiber. Consequently, an amount of such crystals constituting at least about 25% by volume of the final product will be present. Stated differently, fillers can be combined with the crystalline material in the gelation step in an amount to constitute 75% of the final product.

Heat treatments at higher temperatures within the above-cited range customarily yield crystals of large dimensions, e.g., up to 50 microns in diameter. In general, temperatures between about 700°–900° C. have been utilized for times of about one to eight hours with higher temperatures, i.e., up to 1200° C., being used for relatively short periods of times, viz., about 3–15 minutes. Nevertheless, the obtaining of a desired crystal size via varying temperatures and times of heat treatment is well known to the worker in the glass-ceramic art. For example, a heat treatment at about 700° C. of a particular glass composition can yield crystals having an average diameter of about one micron arranged in the form of books, whereas the same glass when treated at 800° C. can exhibit books of crystals having an average diameter of about five microns. In general, crystal sizes between about 0.5–20 microns are preferred.

Increased temperatures of heat treatment or extended times of heat treatment can result not only in larger crystal size but also (due partly to fluoride volatilization) can lead to the development of amphibole and other non-micaceous crystal phases.

A modification of the above-described basic method for producing gels, papers, films, fibers, and boards contemplates the hydrothermal treatment of anhydrous glasses and glass-ceramics to form analogous hydroxyl micas. The general method therefor involves four steps depending upon whether a glass or a glass-ceramic body is initially produced:

(a) a batch having a composition similar to that operable with the glass-ceramics, but commonly with less or no fluoride, is melted, (b) the melt is simultaneously cooled to at least within, and preferably below, the transformation range thereof and a glass body is shaped therefrom;

(c) if a glass-ceramic body is desired, the glass body will be heat treated at about 700°–1200° C. to cause the growth in situ of crystals of magnesium metasilicate and lithium disilicate and/or sodium magnesium silicate and/or silica in the case of compositions essentially without fluoride, and/or lithium and/or sodium fluorhectorite, and/or boron fluorphlogopite, and/or a solid solution of those crystals in the case of compositions containing significant amounts of fluoride;

(d) the glass or glass-ceramic body is subsequently exposed to a water-containing gaseous atmosphere of at least 50% relative humidity, preferably a saturated atmosphere, at temperatures between about 200°–400° C. for a time sufficient to cause the development of crystals of hydroxyl equivalents of lithium and/or sodium fluorhectorite, and/or boron fluorphlogopite, and/or a solid solution of those crystals in the case of a glass body or, in the case of a glass-ceramic body, to either partially or totally convert the crystals of magnesium metasilicate and lithium disilicate and/or sodium magnesium silicate and/or silica into a hydroxyl hectorite, and/or to partially or totally convert the crystals of lithium and/or sodium fluorhectorite, and/or boron fluorphlogopite, and/or a solid solution of those crystals into the hydroxyl equivalents thereof.

The rate at which crystals are developed via this hydrothermal treatment is a function of both temperature and relative humidity. Hence, longer times of exposure will be required at lower temperatures and/or lower relative humidity atmospheres. Accordingly, times as short as 0.5 hour may be sufficient for treatments at the upper extreme of the range, whereas periods of 48 hours and even longer may be demanded in the cooler portions thereof.

Thereafter, in like manner to the process described above with respect to glass-ceramic bodies produced either via the conventional or spontaneous method, the bodies formed through this hydrothermal practice are contacted with water or other polar liquid to cause spontaneous swelling and disintegration into small particles accompanied with gelation of the particles. The gel is then treated to prepare a film or fiber.

Glass-ceramic bodies produced in accordance with the spontaneous method described above are also operable in this embodiment of the invention.

The interlayer lithium ions can be fully replaced with $Na^+$ or $\frac{1}{2}Sr^{+2}$ ions on a cation basis, and partly by $\frac{1}{2}Ca^{+2}$ or $\frac{1}{2}Pb^{+2}$ ions on a cation basis, and the water swelling character of the material retained. Interlayer sodium ions can also in like manner be replaced by larger cations. Accordingly, whereas the following discussion is directed to $Li^+$ ions, it will be appreciated that $Na^+$ ions will function in a similar manner. Moreover, the presence of some $Li^+$ ions appears to yield better final products. Where $Li^+$ or $Na^+$ ions occupy all or the majority of the interlayer positions, the water-swelled material may form a gel by itself when contacted with water. Otherwise, the pH of the aqueous dispersion may have to be altered to initiate gelation.

Where non-micaceous particles are present, the glass-ceramic or gel will desirably be ballmilled or treated in some other way to reduce the size of such foreign particles preferably below about two microns. The smoothness and strength of the final paper can depend upon the amount and particle size of impurities since they impart roughness and points of weakness.

Optionally, the water-gel mixture may be agitated in some manner to assist in delaminating the books of crystals into flakes and to help further break down the resulting flakes into strips exhibiting a rectangular-like morphology and narrow ribbons which enhance the strength and flexibility of the final paper. For example, the water-gel mixture may be boiled for an extended period of time, e.g., up to 24 hours. Other operable modes of agitation include ultrasonic dispersion, autoclaving, freeze drying, and shearing.

A spontaneous glass-ceramic product can be made by melting a batch having the necessary components in the proper stoichiometry to secure a lithium and/or sodium water-swelling mica selected from the group of fluorhectorite, boron phlogopite, and a solid solution between those crystals, simultaneously cooling the melt to a temperature between about 900°–1050° C. to shape the melt into a glass body and to cause phase separation and nucleation to take place therein, further cooling the glass body to a temperature between about 700°–900° C. and maintaining that temperature for a sufficient length of time to effect crystallization therein, and then cooling the crystallized material to room temperature. Commonly, exposure times sufficient to cause phase separation and nucleation will be less than a minute, frequently a few seconds will be adequate. Treatment periods as brief as two minutes will be adequate to achieve crystallization although longer periods, up to several hours, can be used, depending upon the crystal size desired.

This method has two advantages when compared with the conventional process for forming glass-ceramic articles involving the reheating of precursor glass articles. Thus, the rate of production is much faster and less stable glasses, i.e., glass compositions prone to devitrify readily, can be employed. However, the method does not permit the close control of crystal size which is a hallmark of the conventional process. Accordingly, the preferred practice of the present invention contemplates forming the glass-ceramic materials in accordance with the conventional process.

As was observed above, the gel can be treated in several ways to convert it into paper. One of those methods involves adjusting the solid:liquid ratio by dilution or evaporation to yield a mixture customarily having a solids content of about 2–25% by weight and, most generally, not more than about 50% by weight. This mixture appears to exhibit excellent fluidity for casting films. Where desired, of course, various amounts of fillers, preferably fibrous materials, can be added to the mixture. (And, also, of course, where fibers are to be produced through, e.g., an extrusion technique, or boards are to be formed, e.g., via pressing, the operable solid:liquid ratio of the gel can be adjusted to a much higher level, perhaps to a solids content of 80%.) The gel is then poured or otherwise deposited onto a flat, inert, impermeable, and smooth surface, e.g., metal, glass, glass-ceramic, or plastic, and allowed to dry. Drying may require times ranging from a few hours up to several days, depending upon particle size and the quantity of non-micaceous particles present. Those gels consisting essentially entirely of mica crystals and having the largest-sized particles require the longest drying times due to a lack of breathing in the film. Hence, the surface of such films may dry and seal the interior from drying for periods up to a week and longer. Dielectric drying and microwave drying can be utilized to expedite the drying process as can more conventional drying techniques. Nevertheless, care must be observed to avoid blistering the paper. After drying, the film can be readily peeled off the supporting surface except when very thin, viz., less than about 50 microns, and has the physical appearance of paper. At this stage, the material swells in water and disintegrates after a few minutes contact therewith. This swelling of the paper can be prevented, however, by immersion of the film into a solution containing large cations, e.g., a salt solution containing such cations as $K^+$, $Rb^+$, $Cs^+$, $Ca^{+2}$, $Sr^{+2}$, $Ba^{+2}$, $Pb^{+2}$, $H_3O^+$, and $NH_4^+$, or certain organic polycations, e.g., aniline hydrochloride and quaternary ammonium compounds, for a sufficient length of time to cause an exchange to take place between the $Li^+$ and/or $Na^+$ ions and the large cations from the solution. After the cation exchange reaction, the paper is washed thoroughly to remove the lithium salt which would precipitate on the surface of the paper. If required, the paper may be heated at temperatures up to about 500° C. to remove adsorbed moisture. Although good quality paper can be made in this manner, the technique is not readily adapted to large scale and rapid production.

In an alternative method the gel is contacted with a $K^+$, $Rb^+$, $Cs^+$, $NH_4^+$, $H_3O^+$, $Ba^{+2}$, $Pb^{+2}$, $Sr^+$, or $Ca^{+2}$-containing solution which leads to an exchange of $Li^+$ and/or $Na^+$ ions with the larger ions and causes flocculation of the gel. The mechanism underlying flocculation consists of electrically neutralizing the negatively-charged mica or clay particles which have been separated due to hydration and partial loss of interlayer cations into the surrounding solution. The floc settles out such that the supernatant liquid containing the lithium and/or sodium salt can be easily discarded or recovered. The floc is then thoroughly washed, blended to effect homogenization, the solid:liquid ratio thereof adjusted, and applied to a flat and smooth substrate in like manner to that described above. The film or sheet appears to dry somewhat more rapidly than that discussed in the previous method and the resulting paper resists disintegration when immersed into water without further chemical treatment. However, the quality of the paper produced does not appear to be quite as good as that formed via the method described immediately above.

In still another method the ion exchange step is combined with the forming of the sheet. This process has the advantage that the as-formed sheet needs only to be washed to remove any excess salts and then dried. The essence of the method involves bringing the gel and a flocculating agent into contact at an interface where a skin or membrane is formed. Thus, the flocculated flakes appear to hold together as a mass or unit, a phenomenon referred to herein as macroflocculation. This skin is drawn away to renew the contact between gel and flocculating agent, thereby enabling a continuous sheet to be formed. This method appears to be best adapted to lithium and certain sodium-containing mica gels that exhibit macroflocculation, which may be due to the unique microstructure of those gels, as will be discussed hereinafter.

An example of this process involves floating a liquid containing a flocculating agent over the gel. The liquid may be immiscible with the gel or have a density different from that of the gel, thereby reducing the tendency of the two liquids to mix. To further assist in establishing the interface and to decrease the tendency of the two liquids to mix, a mist of the flocculating agent-containing liquid can be initially sprayed upon the surface of the gel. The skin or membrane formed at the interface has a higher solids content than that of the gel. The flocculated layer also functions to prevent mixing together of the two liquids.

As was noted previously, a fiber or film prepared from the gel with no exposure to an ion exchange reaction is subject to spontaneous disintegration in the presence of water. Nevertheless, it will be appreciated that the physical and electrical characteristics of fibers and films exposed to the ion exchange reaction will be different from those demonstrated by fibers and films prepared via the simple drying of the gel. Consequently, where the properties of the latter fibers and films are of interest, those bodies or paper and board made therefrom will be coated with a water-resistant material or otherwise protected from ambient moisture.

FIG. 1 schematically depicts an apparatus for carrying out this embodiment of the inventive process. Hence, a liquid containing a flocculating agent 1 is floated over a gel 2 to form a skin or membrane 3 therebetween. The skin 3 is drawn away as a film 4 and brought into contact with a roller or drum 5. By revolving drum 5, a continuous sheet of film 4 can be rolled thereon.

Figure 2:
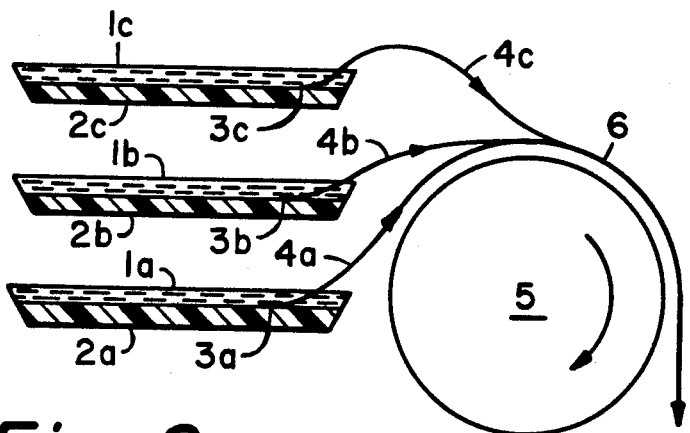
FIG. 2 is a schematic representation of an apparatus suitable for continuously drawing three films which can be combined into a three layer composite sheet according to an embodiment of the inventive process.

FIG. 2 schematically illustrates the formation of a three-layer laminated sheet utilizing the basic apparatus of FIG. 1. Thus, a liquid containing a flocculating agent 1a, 1b, and 1c is floated over a gel 2a, 2b, and 2c to form a skin or membrane 3a, 3b, and 3c therebetween. The skin is drawn away as a film 4a, 4b, and 4c and the three films are brought together to form a three-layer laminated film or sheet 6 which can then be rolled onto drum or roller 5. Obviously, this technique lends itself to the production of thick sheets or boards of the inventive materials.

Variations upon that method are also possible. For example, the position of the liquids can be reversed; i.e., the gel can be floated onto the liquid containing the flocculating agent. In another example a three-layer system can be formulated. Hence, for example, the gel can be floated onto the liquid containing a flocculating agent and, thereafter, a liquid containing a flocculating agent can be floated onto the gel. Although somewhat difficult to control, this inventive embodiment provides simultaneous flocculation at two surfaces.

An alternative method to pre-contacting the gel with a flocculating agent-containing liquid at an interface is afforded by extruding the gel into a flocculating agent-containing liquid. The extrusion orifice can be a fine hole to form thread or a narrow slit to form sheet. Where sheet is being made, the method permits flocculation to occur on both sides simultaneously and allows careful control to be maintained of sheet thickness by regulating such parameters of extrusion as slit width, extrusion rate, etc. By ejecting the gel in a thin stream, as from a hypodermic needle, into a flocculating agent-containing liquid, a continuous fiber can be pulled from the liquid and attenuated to a desired diameter.

Figure 3:
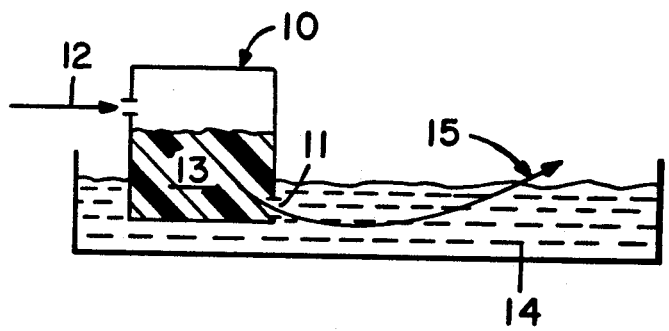
FIG. 3 is a schematic representation of an apparatus suitable for continuously extruding a fiber or film according to an embodiment of the inventive process.

FIG. 3 is a schematic representation of an apparatus suitable for forming films or sheet through an extrusion process. In this embodiment, a container 10 is designed having a slit orifice 11 in a lower sidewall thereof and an aperture 12 in the top or upper sidewall thereof to admit a source of pressure. A quantity of gel 13 is deposited within container 10. Container 10 is then inserted into a liquid containing a flocculating agent 14 and pressure through aperture 12 is applied to the surface of gel 13 which forces gel 13 out of container 10 to form a thin film 15 which can be drawn out of flocculating agent-containing liquid 14. Air or other gas inert to gel 13 can provide a convenient source of pressure or, if desired, a piston or other mechanical means can be employed to exert sufficient pressure on gel 13 to extrude it through slit orifice 11.

Rather than laying up or stacking films or sheets and then drying, with or without pressing, to form a relatively thick composite or board, it has been found that the wet gel, after flocculation, can be pressed and dried into board or other configuration.

It is believed that the ion exchange reaction takes place with the interlayer $Li^+$ and/or $Na^+$ ions being exchanged with larger cations, e.g., $K^+$, $Rb^+$, $Cs^+$, $Ba^{+2}$, etc. An obvious result of this exchange, of course, is the fact that the crystals present in the final product, be it paper, film, fiber, or board, are no longer simply lithium and/or sodium fluorhectorites, boron fluorphlogopites, solid solutions thereof, etc. but, instead, the crystals will have a major proportion of large interlayer cations therein, the identity of the cations being dependent upon the ion exchange reaction and, accordingly, the chemical nature of the flocculating agent. Consequently, the crystals present in the final inventive products have been defined as "exchanged lithium and/or sodium micas selected from the group of fluorhectorite, hydroxyl hectorite, boron phlogopite, hydroxyl boron phlogopite, and solid solutions among those and between those and other structurally-compatible species selected from the group of talc, fluortalc, polylithionite, fluorpolylithionite, phlogopite, and fluorphlogopite".

The most favorable sheet silicates to swell in water and gel are those with one $Li^+$ in the interlayer and four $Si^{+4}$ ions or three $Si^{+4}$ with one $B^{+3}$ ion in the tetrahedral layer per unit formula. An ideal composition appears to have the structural formula $Li^{xii}(Mg_2Li)^{vi}Si_4{}^{iv}O_{10}F_2$, although considerable $Mg^{+2} \rightleftarrows 2Li^{30}$ is permitted in the octahedral (VI ligand position) without affecting the unique characteristics of the composition. The closest naturally-occurring counterpart is hectorite, which has the structural formula

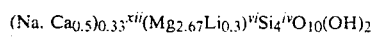

$(Na, Ca_{0.5})_{0.33}{}^{xii}(Mg_{2.67}Li_{0.3})^{vi}Si_4{}^{iv}O_{10}(OH)_2$ and is found in Hector, Calif. Accordingly, we have termed our crystal lithium fluorhectorite.

Another unique water-swelling mica appears to have the structural formula $Li^{xii}Mg_3{}^{vi}(BSi_3)^{iv}O_{10}F_2$, which represents a $B^{+3} + Mg^{+2} \rightleftarrows Si^{+4} + Li^+$ in lithium fluorhectorite. This phase has been designated lithium boron fluorphlogopite because of its relation to synthetic boron fluorphlogopite ($KMg_3BSi_3O_{10}F_2$).

Replica electron micrographs of the paper prepared in accordance with the present method containing exchanged mica crystals having compositions and stoichiometries described above exhibit thin flakes in various stages of breakdown to rectangular-like strips and ribbons. The ribbons and strips have typical measurements of about 0.5–10 microns long, about 500 Å–5000 Å wide, and less than about 100 Å thick. The flakes are irregularly shaped with diameters commonly averaging about 0.5–10 microns and cross sections customarily of less than about 100 Å. The ribbons frequently demonstrate a singular inter-fingered, interwoven, and overlapping texture with numerous regions of parallel or sub-parallel development. The ribbons and strips often appear grouped together to form composite or patchwork flakes. It is this morphology, seemingly consisting of a continuum of flakes, rectangular-like strips, and interwoven ribbons in parallel or subparallel zones or sheaths, apparently peculiar to the lithium and/or certain sodium-containing crystals described above, and developed during crystallization and water swelling of the glass-ceramics, which is believed to help confer the desired strength and flexibility to the paper. The presence of a substantial proportion, i.e., at least 10%, of ribbons and/or strips insures high strength, flexibility, and creasibility in the final product.

This unique ribbon and strip structure appearing in the inventive fluormicas is not believed to have previously been reported in the literature. We have postulated that its development is due to twinning or parting along a plane which is at some high angle to the basal plane. This twinning or parting, in turn, is conjectured to be related to lower symmetry in the mica crystal caused by cation ordering in the octahedral layer. Thus, in stoichiometric hectorite this octahedral layer is composed of two cations having slightly different ionic size, viz., $Li^+$ and $Mg^{+2}$, which are present in a ratio of 1:2. The larger size of the $Li^+$ ion makes lattice fit between the octahedral layer and the $Si_4O_{10}$ tetrahedral layer difficult. At high temperatures, where a higher entropy and greater disorder would be expected, a random mixing of $Li^+$ and $Mg^{+2}$ ions in the octahedral positions is believed likely, thereby yielding the normal hexagonal symmetry found in this layer and a generalized lattice strain. At lower temperatures, however, it is believed that at least some ordering of the $Li^+$ and $Mg^{+2}$ ions is likely, which ordering can lead to elongation preferential to one direction in the octahedral layer and, hence, reduce the hexagonal symmetry of the layer to orthorhombic. This phenomenon can then give rise to the development of parallel twinning or parting in a single direction to relieve the resulting stresses and, in so doing, result in the formation of ribbons or strips. This hypothesis leads to the conclusion that ribbons and/or strips would be more likely to occur in crystals formed at low temperatures as, for example, in the production of glass-ceramic bodies, than in crystals formed at temperatures just below the melting point thereof as, for example, in the slowly cooled liquids present in fusion casting techniques. More explicitly, this rationale is believed to explain why the use of glass-ceramic starting materials in the gelation step favors the development of ribbons and/or strips. Electron diffraction examinations of the thin ribbon-like crystals supports an orthorhombic rather than hexagonal symmetry.

Various optional chemical ingredients can be included in the base composition. Such materials can be classified into three general categories: (a) substitutions in the lithium and/or sodium fluorhectorite structure; (b) solid solutions between fluorhectorite and other micas and related sheet structures; and (c) compositions peripheral to lithium and/or sodium fluorhectorite in which a glassy phase or other crystal is intentionally included.

SUBSTITUTIONS IN LITHIUM FLUORHECTORITE

Table III, infra, recites compositions wherein cation substitutions for part or all of the interlayer $Li^+$ ions were made utilizing $Na^+$, $Pb^{+2}$, $K^+$, $Ba^{+2}$, and vacancies. The better papers were obtained with vacancies $\square$, $Na^+$, and $Pb^{+2}$ in that order. The vacancies must be accompanied by suitable cation substitution elsewhere to maintain electrical neutrality. The best papers were secured where $\square^{iv} + Mg^{vi} \rightarrow Li^{iv} + Li^{vi}$. The other substitutions yielded glass-ceramic materials which either did not swell in water or did not gel in the 2–15% by weight range, this range being found to be particularly suitable for papermaking. The substitution of $Na^+$ for $Li^+$ produced better quality glasses and very stable gels. These will be discussed in more detail below in the section devoted to fluorhectorite solid solutions. The substitution of $Pb^{+2}$ for $Li^+$ in amounts up to as much as 30% by weight PbO resulted in excellent glasses that provided papermaking gels, (Example 3 of Table III, infra). To generate vacancies in the interlayer, the composite layer charge was increased by raising the $Mg^{+2}$ content at the expense of $Li^+$. Example 2 of Table III, infra, was spontaneously formed into a glass-ceramic which produced a good gel and a flexible paper. The theoretical structural formula of Example 2 is $Na_{0.33}Li_{0.33}Mg_{2.67}Si_4O_{10}F_2$. It is not definitely known whether the 0.33 Li sites are interlayer or octahedral. If lithium is present in the octahedral layer, then up to two-thirds of the interlayer sites remain vacant; whereas, if lithium is totally present in the interlayer, then only one-third of the sites are vacant. In any event, papermaking gels are obtained.

Table III also reports compositions wherein substitutions were made in the octahedral positions of the fluorhectorite structure. Such substitutions are relatively more important from microstructural considerations than the interlayer ones discussed immediately above. The following substitutions were carried out to replace up to one of the two $Mg^{+2}$ per formula.

Up to a level of about 25% by weight ZnO yielded a paper with a composite mica morphology apparently containing both flakes and strips. X-ray diffraction analyses indicated the absence of any Zn-containing crystal phase except the mica. The quality of the gel and the resulting paper was quite good (Example 4).

The substitution of $Ni^{+2}$ up to about 10% by weight NiO yielded a yellowish-brown glass (Example 5). The glass-ceramic material prepared therefrom swelled completely to a yellowish-green stable gel which produced a paper of excellent smoothness and flexibility. The crystal makeup of the paper was observed to consist apparently of intermingled flakes and strips. X-ray diffraction analyses showed no crystalline phase other than mica in which $Ni^{+2}$ could be present.

The substitution of up to about 10% by weight CoO produced a glass of deep blue color which, when heat treated, provided a black glass-ceramic (Example 7). When immersed into water, the outside surface of the glass-ceramic did not swell but the interior portion formed a good gel which yielded a pink paper of excellent quality.

The substitution of copper for magnesium resulted in a yellow glass at 10% by weight CuO and a green glass at 5% CuO (Example 8). Glass-ceramic materials produced therefrom developed a black, metallic surface which did not swell when immersed into water. However, the interior portion swelled to provide an orange-yellow gel which could be formed into good quality paper.

The introduction of $Cd^{+2}$ sharply increased the content of crystal species which did not swell when contacted with water [$d_{(001)} = 9.2$ Å]. At about 7.5% by weight CdO, only about 25% of the glass-ceramic material gelled when immersed into water but the gel that was produced yielded good flexible paper (Example 10).

The inclusion of $Zr^{+4}$ in amounts of about 4% and 8% by weight $ZrO_2$ led to excellent glass quality. The resulting glass-ceramics manifested complete water swelling at the 4% $ZrO_2$ level, but incomplete water swelling at the 8% $ZrO_2$ level due to the development of a non-swelling mica [$d_{(001)}$=9.2 Å] becoming a major phase. Nevertheless, the gelled portion yielded good flexible papers in both instances (Example 11).

$Ti^{+4}$ was incorporated in amounts of about 3% and 6% by weight $TiO_2$ and opaline glasses were produced in each case. Glass-ceramic materials prepared therefrom swelled completely when immersed into water and yielded stable gels which could be dried to excellent papers (Examples 6 and 9). $TiO_2$ additions also permitted the substitution of oxygen for fluorine to yield fluorine-deficient hectorite. Examples 12 and 13 (F=1.75 and 1.5 per formula, respectively) provided very good papermaking gels.

$Mn^{+2}$ is the largest cation known to occur in the octahedral layer. When added in an amount of 10% by weight MnO, good quality, light brown glass was formed. However, only a small part of the glass-ceramic material produced therefrom exhibited swelling when contacted with water, yielding a muddy gel. The resulting paper was of relatively poor quality.

The inclusion of $Fe^{+2}$ in amounts up to 20% by weight FeO gave good quality glass having a grayish-black color. Upon heat treatment, the resulting glass-ceramic evidenced a metallic skin covering a water-swelling interior portion. However, the gel quality was poor and the paper produced therefrom was also poor.

Substitutions of $Al^{+3}$, $B^{+3}$, $Mg^{+2}$, and $P^{+5}$ for $Si^{+4}$ were made in the tetrahedral layer. The inclusion of $Al^{+3}$ resulted in the growth of beta-spodumene solid solution in the glass-ceramic materials as a secondary phase accompanying the fluorhectorite. The stability of the gel deteriorated precipitously as the $Al^{+3}$ level was increased and no paper could be formed with $Al_2O_3$ additions in excess of about 10% by weight. It was not determined whether any $Al^{+3}$ entered the tetrahedral layer. The incorporation of $B^{+3}$ up to about 10% by weight $B_2O_3$ appeared to improve glass quality. The glass-ceramics produced therefrom exhibited complete water swelling and gelation and could be dried into good paper. Additions of $B_2O_3$ in excess of about 15% resulted in extra glass. It is believed that $B^{+3}$ can enter the fluorhectorite structure if the $SiO_2$ content is reduced. Stoichiometric $LiMg_3BSi_3O_{10}F_2$, (lithium boron fluorphlogopite) which represents a substitution of $B^{+3}+Mg^{+2}$ for $Li^++Si^{+4}$ in fluorhectorite, gave a water-swelling composition and a good paper (Example 42). Further substitutions of transition metal ions such as iron, zinc, cobalt, nickel, etc., for magnesium, as well as the substitution of $Al^{+3}$ for $B^{+3}$, can be made in this trisilicic mica, resulting in still other paper-forming compositions. Ionic pairs in the octahedral layer, e.g., $Mg^{+2}$, $Zn^{+2}$, or in the tetrahedral layer, e.g., $B^{+3}$, $Al^{+3}$, may give rise to similar order-disorder phenomena as are believed to occur in hectorite-type structures.

Phosphorous additions greatly reduced glass stability and Example 1, approaching 10% by weight $P_2O_5$, could only be formed into a glass-ceramic utilizing the spontaneous formation method. The resulting material swelled to a good gel when immersed into water but the quality of the dried paper was not very good, however.

MgO substitutions for $SiO_2$ (up to 10-15% $Mg^{+2} \rightleftarrows Si^{+4}$, or roughly 1 of 8 $Si^{+4}$ ions replaced) yielded good gels and papers, especially in the compositions of low $Li_2O$ contents, but the amount of $Mg^{+2}$ actually in the tetrahedral layer of the mica structure was not determined.

BASIC FLUORHECTORITE SOLID SOLUTIONS

Table IV, infra, reports compositions illustrating the five components of the fluorhectorite solid solution in the system $Li_2O$-$Na_2O$-MgO-$SiO_2$-F, viz.:
Lithium fluorhectorite, $LiMg_2LiSi_4O_{10}F_2$
Sodium fluorhectorite, $NaMg_2LiSi_4O_{10}F_2$
Lithium fluormontmorillonoid, $LiMg_{2.5}Si_4O_{10}F_2$
Sodium fluormontmorillonoid, $NaMg_{2.5}Si_4O_{10}F_2$
Fluortalc, $Mg_3Si_4O_{10}F_2$ The system includes eight two-component and four three-component subsystems which may or may not represent true components of a phase diagram. Nevertheless, as a matter of convenience, they are discussed below as if they were quinary components.

$LiMg_2LiSi_4O_{10}F_2$-$NaMg_2LiSi_4O_{10}F_2$: The Li-end-member, Example 14, could be melted to transparent or opaline glasses in relatively thin sections which could then be heat treated to glass-ceramic bodies. In cross sections greater than about 0.125", the glass crystallized upon cooling so the desired relatively uniformly fine-grained glass-ceramic was secured utilizing the spontaneous formation method. Glass stability improved through additions of $Na_2O$, particularly beyond Example 28 having the formula $Li_{0.2}Na_{0.8}$. However, gel quality deteriorated with increasing $Na_2O$ so that the particles tended to settle when left in water overnight. Moreover, the dried paper became weak and less flexible as the level of $Na_2O$ was raised. The Na-end-member, Example 15, did not swell when immersed into water although several different heat treatments varying from 700°-1100° C. were applied to the precursor glass to develop a different microstructure in the glass-ceramic. The entire composition series contained fluorhectorite (or non-gelling mica in the Na-rich compositions) as the predominant crystal phase accompanied by minor quantities of $Li_2Si_2O_5$, alpha-quartz, and protoamphibole. This study indicated that up to about 10% by weight $Na_2O$ could be included in the base composition without destroying the papermaking capability thereof.

$LiMg_2LiSi_4O_{10}F_2$-$LiMg_{2.5}Si_4O_{10}F_2$: At the high-Li-end of the series transparent glasses were formed, but such became opaline with increasing additions of $Mg^{+2}$. At and above 24% by weight MgO (formula $Mg_{2.1}Li_{0.8}$), glass-ceramic materials were prepared utilizing the spontaneous method. Nevertheless, the entire series produced excellent gels when immersed into water and yielded good quality, flexible papers when dried. X-ray diffraction analyses identified the presence of protoamphibole in minor amounts accompanying fluorhectorite in all compositions.

$NaMg_2LiSi_4O_{10}F_2$-$NaMg_{2.5}Si_4O_{10}F_2$: This series of compositions provided very stable, transparent glasses but the glass-ceramics derived therefrom did not swell when immersed into water. X-ray diffraction analyses indicated the predominant crystal phases to be mica and fluormagnesiorichterite except for the $Mg_{2.5}$ end which evidenced no mica at all.

$LiMg_{2.5}Si_4O_{10}F_2$-$NaMg_{2.5}Si_4O_{10}F_2$: Glass stability tended to deteriorate toward the $Li^+$ end of this series.

At formula $Li_{0.5}Na_{0.5}$ a body was generated having a finegrained interior portion with a crystalline surface layer containing hectorite as the sole phase therein. When immersed into water, the material swelled but gelled only in part. The gelled portion formed a weak but otherwise satisfactory paper.

$LiMg_2LiSi_4O_{10}F_2$-$Mg_3Si_4O_{10}F_2$: Glass stability was rapidly lost as the compositions moved toward the $Mg_3$ end; as a result glass-ceramics could only be produced via the spontaneous method. However, all the compositions up to formula $Li_{0.33}Mg_{2.64}Li_{0.33}$ nearly completely gelled to produce good quality, flexible paper. X-ray diffraction analyses identified the presence of fluorohectorite and minor amounts of cristobalite and amphibole.

$NaMg_2LiSi_4O_{10}F_2$-$Mg_3Si_4O_{10}F_2$: Transparent glass was obtained up to $Na_{0.5}$ but the glass-ceramic materials derived therefrom contained a non-swelling type mica [$d_{(001)}=9.81$; no change after immersion in water]. At $Na_{0.33}$ (Example 18 of Table IV), glass stability was not good but a glass-ceramic formed in accordance with the spontaneous method yielded a papermaking gel. The resulting paper was of fairly good quality but relatively less flexible than the normal lithium-containing fluorhectorite paper. X-ray diffraction analyses detected the presence of fluorhectorite, a non-swelling mica, and amphibole.

$LiMg_{2.5}Si_4O_{10}F_2$-$Mg_3Si_4O_{10}F_2$: Glass stability was so poor that glass-ceramics could only be made utilizing the spontaneous method. However, each crystallized product completely swelled to a stable, papermaking gel. The quality of the paper was generally only fair although Example 25, an interlayer-deficient, low $Li^+$ composition, provided paper of good quality.

$NaMg_{2.5}Si_4O_{10}F_2$-$Mg_3Si_4O_{10}F_2$: Excellent transparent glasses were obtained in compositions between $Na_{1.0}$-$Na_{0.5}$ but glass-ceramics derived therefrom gelled only in part. Furthermore, the paper formed from the gelled portion was weak and exhibited a surface of powdery material identified as amphibole. Fluorhectorite, amphibole, and tridymite constituted the major crystal phases in the paper.

$LiMg_2LiSi_4O_{10}F_2$-$NaMg_2LiSi_4O_{10}F_2$-$Mg_3Si_4O_{10}F_2$: Good stable glass was obtained with MgO contents less than 25% by weight near the $Li^+$ end of the series to MgO contents less than 28% by weight near the $Na^+$ end. The glass-ceramics within the system essentially completely swelled when immersed into water and good paper resulted except where MgO and $Na_2O$ exceeded 29% and 7% by weight, respectively. X-ray diffraction analysis indicated that fluorhectorite was the predominant crystal phase with very small amounts of cristobalite and amphibole being identified also.

$LiMg_2LiSi_4O_{10}F_2$-$LiMg_{2.5}Si_4O_{10}F_2$-$Mg_3Si_4O_{10}F_2$: Stable glass information was possible only in those compositions near the $Mg_2Li$ end where the MgO content was less than about 23% by weight. Nevertheless, glass-ceramics could be produced through the spontaneous method over most of the ternary area. In all cases the glass-ceramic materials swelled substantially completely to stable gels when immersed into water. Paper of quite good quality was obtained throughout the composition area. X-ray diffraction analyses identified fluorhectorite as the major crystal phase with minor phases including $Li_2Si_2O_5$, alpha-quartz, and amphibole in that order based upon the amount present.

$LiMg_{2.5}Si_4O_{10}F_2$-$NaMg_{2.5}Si_4O_{10}F_2$-$Mg_3Si_4O_{10}F_2$: Good quality glasses were obtained at and above 4% by weight $Na_2O$. All glass-ceramics in this system (except those near the $NaMg_{2.5}Si_4O_{10}F_2$-$Mg_3Si_4O_{10}F_2$ baseline) produced good, stable gels most of which dried to flexible papers. Example 23, containing only 0.6% $Li_2O$ and a two-thirds interlayer deficiency, gelled completely to form a paper with excellent flexibility. Crystal phases other than fluorhectorite were present in very small amounts only, except where the $Na_2O$ and MgO contents exceeded 6% and 30% by weight, respectively.

$NaMg_2LiSi_4O_{10}F_2$-$NaMg_{2.5}Si_4O_{10}F_2$-$Mg_3Si_4O_{10}F_2$: This system had a very large area of glass formation but, on the whole, the glass-ceramics resulting therefrom exhibited little, if any, gelation when immersed into water. The gels that were formed generally yielded paper of poor quality. X-ray diffraction analyses showed high proportions of non-swelling mica and amphibole. An exception to the norm was Example 20 which could only be formed into a glass-ceramic utilizing the spontaneous method. That composition yielded a smooth, flexible paper with only 0.7% by weight $Li_2O$.

In light of the above studies, compositions suitable for the making of relatively good quality gels with the resultant paper exhibiting practical flexibility and wherein the crystals consist essentially of an exchanged lithium and/or sodium water-swelling mica selected from the group of fluorhectorite, boron fluorphlogopite, and solid solutions between those and between those and other structurally-compatible species selected from the group of fluortalc, fluormontmorillonoid, a crystal species having a stoichiometry midway between fluortalc and fluorhectorite, and fluorphlogopite can be summarized within the following ranges, expressed in weight percent on the oxide basis, of about 0.5–12% $Li_2O$ and/or 0–10% $Na_2O$, 0.5–14% $Li_2O+Na_2O$, 14–38% MgO, 0–15% $B_2O_3$, 0–10% $Al_2O_3$, 35–70% $SiO_2$, and 5–15% F. Up to about 30% total of additional oxides such as are selected from the group of 0–10% CdO, 0–10% CoO, 0–10% CuO, 0–20% FeO, 0–20% $Fe_2O_3$, 0–10% MnO, 0–10% NiO, 0–30% PbO, 0–10% $P_2O_5$, 0–10% $TiO_2$, 0–25% ZnO, and 0–10% $ZrO_2$ may advantageously be incorporated to modify the characteristics of the gel and/or paper. Relatively stable glasses can be produced from compositions solely within the quaternary system $Li_2O$ and/or $Na_2O$-MgO-$SiO_2$-F in the following ranges, expressed in weight percent on the oxide basis, of about 2–10% $Li_2O$ and/or 2–10% $Na_2O$, 2–14% $Li_2O+Na_2O$, 18–32% MgO, 50–70% $SiO_2$, and 7–12% F. The presence of $B_2O_3$ and/or PbO in amounts up to 30% total can frequently be useful in providing stable glasses. It can be observed that the two sets of ranges do not exactly coincide. Thus, inasmuch as the present papermaking process is founded in a gelation reaction between the water-swelling mica material and a polar liquid, the formation of a precursor glass body is not essential except where a conventional glass-ceramic body constitutes the starting ingredient. Moreover, some of the non-glass forming compositions can be cooled to spontaneous glass-ceramics or slightly modified with, e.g., additions of glass formers, to control nucleation and crystallization.

PAPERMAKING COMPOSITIONS PERIPHERAL TO FLUORHECTORITE

To better understand the breadth of compositions which are operable in making paper wherein fluorhectorite is the predominant crystal phase, several areas of glass-ceramic formation peripheral to the principal fluorhectorite composition area (LiMg$_{2-2.5}$Li$_{0-1}$Si$_4$O$_{10}$F$_2$-NaMg$_{2.5}$Li$_{0-1}$Si$_4$O$_{10}$F$_2$-Mg$_3$Si$_4$O$_{10}$F$_2$) described above were explored for the following purposes:

First, to assess the effects of solid solution between hectorite and known water-swelling trisilicic micas, i.e., the strontium phlogopite family, the calcium phlogopite family, the alkali boron phlogopite group, and aluminous tetrasilicic micas, e.g., polylithionite;

Second, to investigate the development of hectorite crystals of high aspect ratios in glass-ceramic bodies wherein a substantial proportion of fluid and stable residual glass, e.g., borates, borosilicates, and phosphates, is present; and Third, to study the effects of substituting Fe$^{+3}$ ions for Mg$^{+2}$ ions in the octahedral sites in hectorite upon the water-swelling capabilities and magnetic properties of the crystal phase.

Hectorite-Boron Phlogopite Glass-Ceramics: A variety of spontaneous glass-ceramic bodies can be prepared having compositions between hectorite and alkali boron phlogopite. Compositions on the join between lithium fluorhectorite (LiMg$_2$LiSi$_4$O$_{10}$F$_2$) and lithium boron fluorphlogopite (LiMg$_3$BSi$_3$O$_{10}$F$_2$) were found to produce good gels and papers. Example 42 illustrates a papermaking composition which is essentially pure boron fluorphlogopite.

Boron Phlogopite-Phlogopite Glass-Ceramics: Compositions between lithium boron fluorphlogopite [LiMg$_3$BSi$_3$O$_{10}$F$_2$] and lithium fluorphlogopite [LiMg$_3$AlSi$_3$O$_{10}$F$_2$] produced spontaneous glass-ceramics which were satisfactory for making paper where the mica content in the glass-ceramic was high. Unfortunately, undesirable phases such as spodumene and norbergite formed as the Al$_2$O$_3$ content approached 10%.

Hectorite-Strontium Phlogopite and Hectorite-Calcium Phlogopite Glass-Ceramics: Glass flakes can be produced from compositions coming between three separate fluorhectorite stoichiometries, viz., lithium fluorhectorite (LiMg$_2$LiSi$_4$O$_{10}$F$_2$), a sub-lithium fluorhectorite (Li$_{0.5}$Mg$_{2.5}$Li$_{2.5}$Si$_4$O$_{10}$F$_2$), and sodium fluorhectorite (NaMg$_2$LiSi$_4$O$_{10}$F$_2$), and water-swelling strontium fluorphlogopite (Sr$_{0.5}$Mg$_3$AlSi$_3$O$_{10}$F$_2$) and water-swelling calcium fluorphlogopite (Ca$_{0.5}$Mg$_3$AlSi$_3$O$_{10}$F$_2$). Table V, infra, reports a number of such compositions with strontium fluorphlogopite. Only the compositions between the sub-lithium fluorhectorite and the strontium fluorphlogopite formed glass-ceramics having water-swelling capabilities and, of those, only those containing 50% by weight or more of the lithium fluorhectorite component yielded flexible papers. Example 31 is illustrative of such a composition. The calcium fluorphlogopites behave similarly to the strontium analogs.

Hectorite-Polylithionite Glass-Ceramics: Stable glasses were prepared from compositions between lithium fluorhectorite (LiMg$_2$LiSi$_4$O$_{10}$F$_2$) and lithium fluorpolylithionite (LiAlLi$_2$Si$_4$O$_{10}$F$_2$) in the range of 25–100% fluorpolylithionite. All of the glasses were opalized so as to demonstrate some degree of translucency. Fluormica was the predominant crystal phase up to about 65% by weight fluorpolylithionite. Higher concentrations of Al$_2$O$_3$ in the glass led to the crystallization of beta-spodumene solid solution and LiF in preference to fluormica. When equal amounts of the two components are employed, a glass-ceramic could be produced having a mica phase which swelled quickly when immersed into water and gave a milky-appearing gel which could be cast and dried to a flexible and creasible paper. Example 32, illustrative of the papers described herein, provided a paper having a somewhat satin appearance.

Glass-ceramic materials were prepared from compositions between sodium fluorhectorite (NaMg$_2$LiSi$_4$O$_{10}$F$_2$) and sodium fluorpolylithionite (NaAlLi$_2$Si$_4$O$_{10}$F$_2$) wherein a mica crystal constituted the predominant phase. Such glass-ceramics exhibited machinability but demonstrated essentially no tendency to swell when immersed into water.

Fe$_2$O$_3$ in Hectorite Glass-Ceramics: Inasmuch as the ionic radius of Fe$^{+3}$ is more nearly comparable to that of Mg$^{+2}$ than are other trivalent ions, several compositions were investigated wherein Fe$^{+3}$ was substituted for Mg$^{+2}$ in the octahedral layer. It was conjectured that, because of the extra positive charge in the Fe$^{+3}$ ions, vacancies in the interlayer position might result, thereby perhaps increasing the rate of water swelling and subsequent ion exchange.

The substitution proved to be possible and glass-ceramics wherein an iron-containing fluorhectorite crystal constituted the predominant phase were produced at Fe$_2$O$_3$ levels up to about 20% by weight. Magnetite (Fe$_3$O$_4$) was identified as a minor phase in glasses containing more than about 10% by weight Fe$_2$O$_3$. This circumstance is believed to be due to the difficulty in avoiding the presence of FeO despite melting under oxidizing conditions and the use of red iron oxide in the batch. In some instances with high proportions of Fe$_2$O$_3$, Fe$_3$O$_4$ was precipitated as the melt was cooled to a glass. However, good glass-ceramic materials could be produced utilizing the spontaneous method. The hectorite crystals exhibited good water-swelling capability and the presence of magnetite did not appear to interfere. Examples 33 and 34 are illustrative of these papermaking compositions.

Hectorite in Borosilicate, Borate, and Phosphate Glasses: The present work with the stoichiometric papermaking lithium fluorhectorite (LiMg$_2$LiSi$_4$O$_{10}$F$_2$), represented by Example 14, has demonstrated that crystal size and crystallization temperature are vital parameters in achieving an optimum gel which can be formed through various techniques into creasible, impervious paper. This situation is believed to be founded in the growing of relatively large mica flakes ($>5$ microns) which may tend to subdivide into many parallel ribbons.

In an attempt to exaggerate the size of the mica flakes, while at the same time maintaining the narrow ribbon twinning characteristic desired, an investigation was made of glass-ceramic compositions wherein the presence of a stable and fluid residual glass would provide the optimum conditions for the formation of mica flakes having high aspect ratios. Therefore, glassy components known to concentrate as fluid glasses such as LiF.B$_2$O$_3$, LiF.B$_2$O$_3$.nSiO$_2$, Li$_2$O.B$_2$O$_3$.nSiO$_2$, MgO.MgF$_2$.mB$_2$O$_3$.nSiO$_2$, Na$_2$O.4B$_2$O$_3$, Na$_2$O.mB$_2$O$_3$.nSiO$_2$, and NaPO$_3$ were added in various proportions to fluorhectorite compositions, melted to glasses, and the glasses heat treated to glass-ceramics. Up to 30% B$_2$O$_3$ can be tolerated but it is preferred to limit its presence up to about 10%.

Some limited success was achieved with the phosphate component with glass stability being limited to compositions with less than 10% by weight P$_2$O$_5$. Example 35 is illustrative of papers formed from such compositions.

Compositions involving the combination of sodium fluorhectorite with sodium borate and borosilicate components produced stable glasses which could be heat treated to glass-ceramics containing fluormica. Nevertheless, the glass-ceramics did not swell appreciably when immersed into water.

A wide range of compositions in the $SiO_2$-$B_2O_3$-$MgO$-$Li_2O$-$F$ system not only formed stable glasses, but those glasses could be heat treated to glass-ceramics which exhibited excellent water-swelling and paper-making characteristics. Several of such compositions are reported in Table V. Especially desirable were compositions made up mainly of fluorhectorite with some $LiF.nB_2O_3$, magnesium fluorborate, or mixed lithium and magnesium fluorborate, borosilicate, or fluorborosilicate glass. Gels made from such compositions, for instance, Examples 36 and 37, could be film cast to strong, flexible, creasible papers. Films made from many of those compositions exhibited two unusual properties, viz., a silvery sheen on normal drying and a tendency to stick to a glass substrate. This latter phenomenon is believed to be due to the presence of a soluble borate species in the gel which bonds to the silicate substrate. It is of interest to note that, when the bonded paper was immersed into an aqueous 2N KCl solution, the sticking was quickly eliminated and the paper could be readily peeled apart. Surprisingly, despite the high $B_2O_3$ concentrations employed in some of these compositions (up to about 26% by weight), the size of the mica platelets did not exceed about 30 microns in diameter. Several of these compositions, including Example 40, could be prepared as gels and drawn as fibers or films.

The precursor compositions operable in this inventive embodiment consist essentially, in weight percent on the oxide basis, of about 35–65% $SiO_2$, 0–30% $B_2O_3$, 10–38% $MgO$, 0–10% $Al_2O_3$, 0.5–12% $Li_2O$, and 5–15% $F$. Up to one-half of the $Mg^{+2}$ and $Li^+$ ions in the octahedral positions can be replaced on a cation basis by such species as $Zn^{+2}$, $Mn^{+2}$, $Co^{+2}$, $Fe^{+2}$, and $Ni^{+2}$, and, in certain instances, substantially all of the interlayer $Li^+$ ions can be replaced by $Ba^{+2}$, $Pb^{+2}$, $Ca^{+2}$, and $Sr^{+2}$.

In investigating the hydrothermal treatment of anhydrous glasses and glass-ceramics to form analogous hydroxyl micas, compositions were designed which would hydrate to known hectorite solid solutions existing between $LiMg_2LiSi_4O_{10}(OH)_2$, $NaMg_2LiSi_4O_{10}(OH)_2$, $Li_{0.5}Mg_{2.5}Li_{0.5}Si_4O_{10}(OH)_2$, and $Na_{0.5}Mg_{2.5}Li_{0.5}Si_4O_{10}(OH)_2$. Fluorine was added to some examples to aid in the development of mica crystals. Table VI records several exemplary compositions along with a description of the autoclaving to which the glasses and glass-ceramics were subjected and the results observed in each instance.

In general, it was found that an autoclave treatment for about 5–32 hours at 300° C. and 1250 psig $H_2O$ was adequate to partially or completely crystallize the great majority of the glasses to hydroxymicas. Crystal sizes were generally quite fine, i.e., about one micron or less, and the crystals gelled very rapidly when the bodies were immersed into water. Where crystallization of the glass during the hydrothermal treatment proceeded more slowly than desired, a rather brief heat treatment in air (900°–1200° C.) to initiate conversion of the glass to a glass-ceramic was frequently helpful. Either surface nucleation accompanied with columnar crystallization or internal nucleation and crystallization led to the formation of anhydrous crystal phases such as magnesium metasilicate (enstatite), lithium disilicate, sodium magnesium silicate, and, more rarely, cristobalite. These crystals were often more easily reacted with steam in the subsequent autoclave treatment than were the original glasses. It is conjectured that the ease of migration of $H_2O$ species along grain boundaries in the crystallized state probably gives rise to the greater rate of hydration of the crystallized materials.

Compositions in the sodium hectorite solid solution range of $NaMg_2LiSi_4O_{10}(OH)_2$–$Na_{0.5}Mg_{2.5}Li_{0.5}Si_4O_{10}(OH)_2$ yielded clear glasses which reacted hydrothermally at 300° C. and a steam pressure of about 1250 psig to produce fine-grained glass-ceramics, some being opaque while others exhibited some translucency. Radial and concentric "spider web" fracturing was frequently observed which was assumed to be the result of unrelieved stresses as water migration and crystallization proceeded from the surface and continued inwardly to the center of each specimen. The glass-ceramics so produced decomposed rapidly when contacted with water.

Example 45 formed a rigid gel after boiling in water and then cooling. Thus, the gel could not be poured and was quite translucent. However, the gel was highly thixotropic and could readily be stirred to the consistency of house paint. This material, typical of the sodium hydroxyhectorite gels, could be painted onto a wood or glass surface and subsequently dried to a uniform and somewhat tough film. The film was easily redissolved in water, however, and fortification thereof required ion exchange in a non-aqueous medium, e.g., potassium acetate butanol. Nevertheless, where the $Na_2O$ content of the original glass is reduced from about 8% to about 6% or less (Examples 47 and 49), a simple ion exchange in a water solution of KCl will serve to fortify the gel against solution in water.

Compositions intermediate between sodium and lithium hectorite, i.e., involving partial $Li^{30}$-$Na^+$ substitution in the interlayer position, only partially reacted hydrothermally when in the glassy state. Crystallizing these bodies (Example 46) via heat treatment in air prior to autoclaving resulted in the subsequent development of good hydroxymicas during the hydrothermal reaction. The crystallized products demonstrated excellent swelling when immersed into water and film casting yielded good smooth and flexible films which could be heated to about 500° C. without injury.

Unfortunately, none of these papers proved to exhibit the excellent creasibility demonstrated by the lithium fluorhectorites (Example 14), nor were they as well adapted to film drawing or fiber drawing processes. These failings are hypothesized to be due to the fine-grained nature of the hydroxy-hectorite glass-ceramic materials. Nonetheless, the good adherence of these films on a variety of substrates makes them excellent candidates for corrosion-resistant coatings or paints.

That such coatings or paints can be derived from compositions containing none or less than 5% fluoride when subjected to the hydrothermal treatment is demonstrated in Examples 43–52. Hence, in most of those exemplary compositions where fluoride is totally absent (Examples 43–46 and 50) or present in reduced amounts (Example 52), the paper formed was somewhat brittle but it exhibited very strong bonding to the substrate. The crystal phase developed in such coatings or paints has a substantial proportion of an exchanged lithium and/or sodium hydroxyl hectorite and also, if fluoride is present, a minor amount of an exchanged lithium and/or sodium fluorhectorite and/or an exchanged solid solution of a lithium and/or sodium fluorhectorite and/or a hydroxyl equivalent thereof. However, the crystals appear to be essentially generally fine-grained, less than 1 micron in length, and composed of mixtures of rectangular-like strips and/or flakes or platelets.

Partial fluoride doping of the oxide glasses permitted pure lithium compositions, i.e., 0% $Na_2O$, to develop mica crystals in the autoclave where crystallization was initially stimulated via heat treatment in air. Some of those compositions produced flexible papers but none demonstrated the good creasibility of the lithium fluorhectorite papers modeled after Example 14.

Gels have also been made from compositions containing low alkali metal oxide and high magnesia contents which were heat treated to glass-ceramics prior to autoclaving. These gels tend to macroflocculate when treated in aqueous solutions of KCl and have been drawn as fibers. A typical composition of this type, e.g., a simple ternary glass devoid of $Li_2O$ consisting essentially of, by weight, 65% $SiO_2$, 28.6% MgO, and 6.4% $Na_2O$, will crystallize from the surface inward when heat treated in air to exhibit a columnar structure. After treatment at 300° C. in a steam atmosphere of 1250 psig in an autoclave, the resultant body gels readily when immersed into water. The resulting gel contained crystals which allowed the drawing of fibers in an aqueous solution of KCl. Unfortunately, however, film casting gave a brittle paper. Nevertheless, film casting of a similar gel wherein part of the $Na_2O$ was replaced with $Li_2O$ yielded a smooth, transparent, and flexible film. Other compositions producing hydroxyhectorite films with good flexibility are Examples 47 and 50.

In like manner to the conventional glass-ceramic and spontaneous glass-ceramic compositions described above, the final products resulting from the hydrothermal treatment will contain crystals consisting essentially of an exchanged lithium and/or sodium water-swelling mica selected from the group of fluorhectorite, hydroxyl hectorite, boron fluorphlogopite, hydroxyl boron fluorphlogopite, and solid solutions among those and between those and other structurally-compatible species selected from the group of talc, fluortalc, polylithionite, fluorpolylithionite, phlogopite, and fluorphlogopite. Accordingly, the ranges of compositions operable in this embodiment of the invention, i.e., compositions capable of producing water-swelling micas via hydrothermal treatment utilizing gaseous atmospheres having a relative humidity of at least 50% and temperatures between about 200°–400° C., consist essentially, expressed in weight percent, of about 0–9% $Li_2O$ and/or 2–10% $Na_2O$, 2–14% $Li_2O+Na_2O$, 15–38% MgO, 0–20% $B_2O_3$, 0–10% $Al_2O_3$, 50–70% $SiO_2$, and 0–12% F. Up to about 20% total of additional oxides such as are selected from the group of 0–10% CaO, 0–10% CdO, 0–10% CoO, 0–10% CuO, 0–20% $Fe_2O_3$, 0–20% FeO, 0–10% MnO, 0–10% NiO, 0–20% SrO, 0–20% PbO, 0–10% $TiO_2$, 0–20% ZnO, and 0–20% $ZrO_2$ may advantageously be included to modify the qualities of the gel and/or paper. Up to one-half of the $Mg^{+2}$ and $Li+$ ions in the octahedral positions can be replaced on a cation basis by such species as $Co^{+2}$, $Fe^{+2}$, $Fe^{+3}$, $Mn^{+2}$, $Ni^{+2}$, and $Zn^{+2}$. The most preferred compositions for this embodiment of the invention are derived from the levels of 0–6% $Li_2O$ and/or 2–8% $Na_2O$, 2–14% $Li_2O+Na_2O$, 20–30% MgO, 0–5% $Al_2O_3$, 0–15% $B_2O_3$, 60–70% $SiO_2$, and 0–6% F. Where crystals of a fluoride-containing composition are desired, at least 5% F. will be included in the precursor glass. In general, steam pressures in excess of about 200 psig are required.

Where the glass body is subjected to the hydration treatment, the crystals observed in the final product consist essentially of the desired lithium and/or sodium water-swelling mica of the above-described structures and stoichiometries. However, where the glass body is initially heat treated to effect crystallization in situ to a glass-ceramic article and this glass-ceramic body then subjected to hydration, the following reaction mechanism applies.

Upon heat treating the glass body at 700°–1200° C. to cause crystallization in situ, crystals selected from the group of magnesium metasilicate, lithium disilicate, sodium magnesium silicate, and silica will be developed where the composition is free from fluoride, and/or of a lithium and/or sodium water-swelling mica selected from the group of fluorhectorite, boron fluorphlogopite, boron fluorhectorite, and solid solutions among those and between those and other structurally-compatible species selected from the group of fluortalc, fluorpolylithionite, and fluorphlogopite, where the composition contains substantial fluoride.

Thereafter, when the glass-ceramic body is subjected to the hydration treatment, the crystals of magnesium metasilicate, lithium disilicate, sodium magnesium silicate, and silica are partially or totally converted into hydroxyl hectorite and/or the fluoride-containing crystals are partially or totally converted into hydroxyl equivalents thereof.

Because of the known structural similarity between the mica minerals and certain layered barium silicate phases, e.g., $BaSi_2O_5$, $Na_2Ba_4Si_{10}O_{20}$, and $K_2Ba_3Si_8O_{20}$, several exemplary compositions were examined to determine the papermaking potential of this group of crystal phases. As a result of this study, glass-ceramics having compositions close to the layered silicate stoichiometries $K_2Ba_3Si_8O_{20}$ and $Na_2Ba_4Si_{10}O_{25}$ were discovered that demonstrate gelation when immersed into water. The former group of glass-ceramics is especially active, forming a greasy slurry in cold water in less than one hour. The pH of the slurry is high (approximately 10) and $K^+$ ions are evidently being removed from the structure.

It is known that binary $BaO$-$SiO_2$ glasses containing about 30–70% by weight BaO can be heat treated to form glass-ceramic bodies. None of those materials, however, manifested water-swelling capabilities but all were easily attacked by hydrochloric acid. Such action causes the $Ba^{30}$ ions to be extracted leaving a semigelatinous silica residue.

Attempts were made to film cast both the water-swelled slurries of $K_2Ba_3Si_8O_{20}$ and $Na_2Ba_4Si_{10}O_{25}$ and the silica gels remaining after the acid leaching of binary $BaSi_2O_5$ and $3BaO.5SiO_2$-containing glass-ceramics. Such attempts were uniformly unsuccessful, there being insufficient adherence of individual particles to form a paper. Investigation determined that the water-swelling, alkali-barium-silicate crystals evidenced a definite platy morphology, but bonding between the plates was either apparently inadequate or the plates were not properly delaminated during swelling of the glass-ceramic and remained in stacked units which could not overlap. However, when those slurries were mixed with lithium fluorhectorite gel to appraise their use as fillers, it was found that an addition of only 20% by weight fluorhectorite was sufficient to effect paper formation in the case of the $K_2Ba_3Si_8O_{20}$ stoichiometry. Nevertheless, that paper, although flexible, was quite weak when compared to those blends containing greater percentages of lithium fluorhectorite.

With the objective of producing a paper having a composition approaching pure silica, the decomposition of binary barium silicate glass-ceramics was studied. Hence, stoichiometric sanbornite ($BaSi_2O_5$) glass-ceramics with a medium-grained microstructure (crystal size about 10 microns) were produced by heat treating precursor glasses at 1200° C. Thereafter, the glass-ceramics were disintegrated through immersion into a 9% by weight aqueous HCl solution. Subsequent washing and filtering of the disintegrated mass in water followed by drying of the residue yielded a talc-like powder which analyzed to be virtually pure silica. The HCl preferentially leached $Ba^{+2}$ ions from the layered silicate and the resulting $BaCl_2$ solution passed through the filter paper. The suspended silica sheets, believed to have a composition of $m(Si_2O_5^{-2}.2H_2O^-).nH_2O$, could not pass through the filter paper and so were easily collected and dried. This silica material was then cast utilizing doctor blade techniques, but, upon drying, manifested essentially no tendency to consolidate into a paper.

Microscopic examination of the microstructure of the dried powder revealed that sheets of silica had indeed been formed. Scanning electron stimulated X-ray analysis determined the essential absence of barium. The sheets evidenced an accordion-like agglomeration, thereby suggesting that, upon leaching the original isotropic sanbornite grains, the sheets of silica had never actually been separated. Numerous attempts were made to break up these agglomerates, e.g., by ultrasonic agitation, thermal cycling, shearing in a blender, and treatments with various acids, bases, and salts, but none of these was really effective.

Although efforts to make papers from pure barium silicate glass-ceramics were not successful, the work indicated that stacked flakes of hydrated silica of roughly 10 microns diameter and very thin cross section could be produced. Such materials can be utilized as refractory compatible fillers for inorganic papers based upon hectorite micas. Such fillers would not only enhance the refractoriness of the paper but also improve the chemical, particularly acid, durability thereof.

As has been noted above, the hectorite gels possess intrinsic characteristics which make them eminently suitable for making papers, films, fibers, and boards. The preferred starting compositions contain lithium fluorhectorite solid solution crystals, with Examples 14 and 40 illustrating some of the best papers.

Example 14 as a glass-ceramic swells and gels in less than one hour when immersed into water, whereas a coarsely crystallized, cooled-in-crucible material does not completely disperse in water for weeks in spite of stirring. This latter situation occurs because the swelled exterior forms a thick pasty layer which shields the interior from contact with water. In both instances, after dispersion in water the pH of the gel (or slip) rises to a value of about 10.5, while a solid-to-liquid ratio of about 50 grams/liter is maintained. This change in pH is believed to be due to a partial exchange of interlayer $Li^+$ with $H_3O^+$ giving rise to a LiOH aqueous solution. Once formed, the gel appears to remain stable indefinitely. Furthermore, acidifying the gel with HCl has no adverse effect upon its stability down to a pH of about 4. Below that level, however, the gel begins to thicken, thereby indicating acid attack on the octahedral layer with the partial breakdown of the sheet structure and formation of amorphous silica. X-ray diffraction patterns of the material show broad and diffused peaks of hectorite. At a pH of about 2, the gel becomes thick like jelly. The resulting dried materials evidence no peaks in X-ray diffraction patterns, thereby indicating the total breakdown of hectorite to a colloidal silica gel.

As has been discussed above, the gels flocculate upon additions of solutions containing large cations such as $K^+$, $NH_4^+$, $H_3O^+$, $Ba^{+2}$, $Ca^{+2}$, $Sr^{+2}$, etc. Flocculation results from the penetration of those cations through the hydration envelope of hectorite particles and the subsequent expulsion of water molecules both from within and outside the structure. Since it does not appear that total exchange of $Li^+$ ions is required to initiate flocculation, it is postulated that surface charge satisfaction rather than the degree of $Li^{30}$ replacement may constitute the basis therefor. The rate of flocculation depends primarily upon the nature of the replacing and replaced cations, but other factors such as stirring, ionic strength, etc., also exhibit an effect. Customarily, the larger the size of the cation, the more effective it will be as a flocculating agent. In all cases where $Li^+$ ions are in the interlayer, the reaction is substantially instantaneous. Where $Na^+$ ions are in the interlayer, the reaction is significantly slower. This phenomenon permits the lithium hectorite gels to flocculate in a unique manner. Hence, for example, a gel prepared from Example 14 glass-ceramic macroflocculates upon the addition of KCl, CsCl, etc., to a single coherent body rather than numerous agglomerated particles. Where a potassium salt is utilized, the resultant body consists of a continuous skin of edge-to-edge $K^+$-linked hectorite particles which orient at the interface, overlapping continuously, and thus excluding the interior from further reaction. When the body is lifted or the skin is pulled, rupture and bleeding occur which bring new gel into contact with $K^+$ ions, thereby causing continuous reformation of the skin to follow.

This phenomenon underlies a method for drawing a continuous fiber or sheet which, basically, involves bringing together at an interface the gel and a flocculating agent, e.g., a $K^+$ salt solution, and pulling or drawing the skin away from the interface. It is recognized that all the factors controlling the phenomenon are not now fully understood, but several pertinent generalizations can be made;

(a) unless at least 0.5% by weight $Li_2O$ is present in the composition, only a very weak skin forms;

(b) particle morphology, i.e., the presence of a substantial amount of rectangular-like strips and/or interwoven ribbons, is important and glass-ceramics appear to be the best precursor materials to achieve that morphology;

(c) amphibole, $Li_2Si_2O_5$, quartz, and other non-micaceous crystals, as well as residual glass, should be eliminated or the particle size thereof reduced as much as possible, preferably less than two microns in diameter;

(d) the solid:liquid ratio of the gel must be maintained within such a range that the micaceous particles are sufficiently close together that connectivity can develop, this range having a practical minimum of about 2% by weight solids; and (e) the strength of the skin layer becomes greater if (1) the size of the flocculating cation is larger; (2) the charge of the cation is low; and (3) the ionic strength of the solution is greater.

Cation exchange in lithium fluorhectorite can be represented in the equation

Li-hectorite + $1/nX^{n+} \rightleftharpoons X_{l/n}$-hectorite + Li$^+$ wherein X is the replacing cation and n its valency state. The equilibrium constant K$\alpha$ is represented by the equation $$K\alpha = \frac{[X_{l/n}\text{-hectorite}][Li^+]}{[Li\text{-hectorite}][X^{n+}]^{l/n}}$$

The value of K$\alpha$ for Na-hectorite is known in the literature to be 2.86 for Ca$^{+2}$, 4.42 for Sr$^{+2}$, and 7.91 for Ba$^{+2}$. The reaction with K$^+$, Rb$^+$, and Cs$^+$ ions is irreversible. Moreover, the larger the replacing ion the more strongly it becomes attached. Finally, it appears that the rate of exchange, as well as the degree of replacement, is more closely dependent upon differences in size rather than upon the absolute size of the cations. When the difference is large, the larger cation is placed irreversibly. Accordingly, where the particles are lithium hectorite, the reaction will be rapid and in one direction only for such replacing cations as Ca$^{+2}$, Ba$^{+2}$, K$^+$, Rb$^+$, Cs$^+$, Pb$^{+2}$, Cu$^+$, Ag$^+$, NH$_4^+$, etc., and, if the particles are suspended in a gel, the exchange will be essentially instantaneous. However, if a lithium hectorite paper is immersed into an aqueous salt solution of any of those cations, the exchange reaction is slowed due to orientation and overlapping of the particles which limit the accessibility of exchange sites.

If it is assumed that half of the Li$^+$ ions are in the interlayer, as is the situation with stoichiometric lithium fluorhectorite (LiMg$_2$LiSi$_4$O$_{10}$F$_2$), the total cation exchange capacity of a composition like Example 14 should be about 250 milliequivalents per 100 grams. As noted above, part of the Li$^+$ ion content is replaced by H$_3$O$^+$ ions during water swelling, as well as during the subsequent ion exchange treatment.

Chemical analytical data are recited below in Table I indicating that substantially all of the interlayer Li$^+$ ions in Example 14 are replaceable via a room temperature exchange ($\sim$23° C.) with large cations. The table records the weight percent of Li$_2$O exchanged after immersion for 24 hours into an aqueous salt solution of the listed cations and the corresponding milliequivalents of Li$^+$ ions replaced per 100 grams of hectorite.

TABLE I

| Cation | % Li$_2$O Exchanged | Milliequivalent/100 Grams |
|---|---|---|
| K$^+$ | 3.02 | 202 |
| Ca$^{+2}$ | 2.96 | 198 |
| Ba$^{+2}$ | 3.52 | 235 |
| Mg$^{+2}$ | 2.76 | 185 |
| Cs$^+$ | 2.81 | 188 |
| Pb$^{+2}$ | 2.99 | 200 |
| NH$_4^+$ | 2.88 | 193 |

The replacement of Li$^+$ ions with the smaller Mg$^{+2}$ ions is postulated to be the result of a hydration envelope surrounding the Mg$^{+2}$ ion which causes it to behave in the manner of a larger cation.

Table II reports the milliequivalents of Li$^+$ ions per 100 grams replaced by K$^+$ ions after varying periods of time.

TABLE II

| Time | Milliequivalents/100 Grams |
|---|---|
| 1 minute | 193 |
| 5 minutes | 193 |
| 15 minutes | 193 |
| 30 minutes | 193 |
| 1 hour | 195 |

Inasmuch as 193 milliequivalents of Li$^+$ ions out of a possible total of 200 were replaced within one minute, it is believed fair to state that the ion exchange reaction is essentially instantaneous. A partial chemical analysis of paper prepared from Example 14 after the K$^+$ ion exchange for one minute, as described above, yielded the following values in weight percent: 4.3% Li$_2$O, 8.9% K$_2$O, 22.9% MgO, and 9.2% F.

In overall summary, inorganic gels and ceramic papers, films, fibers, boards, and coatings derived therefrom can be prepared from compositions consisting essentially, expressed in weight percent on the oxide basis, of 0–12% Li$_2$O, 0–10% Na$_2$O, 0.5–14% Li$_2$O+Na$_2$O, 10–38% MgO, 0–30% B$_2$O$_3$, 0–10% Al$_2$O$_3$, 35–70% SiO$_2$, 0–15% F, 0–15% OH, and 4–15% F+OH. Where desired, the base composition may contain up to 30% by weight total of oxides selected from the group of 0–10% CaO, 0–10% CdO, 0–10% CoO, 0–10% CuO, 0–20% FeO, 0–20% Fe$_2$O$_3$, 0–10% MnO, 0–10% NiO, 0–10% P$_2$O$_5$, 0–30% PbO, 0–20% SrO, 0–10% TiO$_2$, 0–25% ZnO, and 0–10% ZrO$_2$.

Prior Art

Although references to micaceous papers can be found earlier, concentrated research efforts can be discerned beginning after World War II and continuing up to the present.

U.S. Pat. No. 2,614,055 discloses a three-step method for converting sheet fragments, splittings, and/or scraps of mica into a pulp suitable for processing into sheets of paper:

(a) the mica materials are heated to 790°–850° C. to cause swelling and to increase their friability;

(b) the heat treated material is immersed into an aqueous medium, this medium being selected such that the material does not dissolve therein, and the mica spontaneously subdivides into thin flakes of about one micron in thickness; and then (c) the flakes are disintegrated through agitation of the suspension to form a pulp.

The patent notes that the aqueous medium can be water alone, an acid solution, or a basic solution. Various binders and fillers are described and it is asserted that the materials are amenable to conventional papermaking machinery.

U.S. Pat. No. 2,791,262 disclose what is stated to be an improvement upon the basic process for forming mica paper. The basic method for producing mica paper is asserted to involve five steps:

(a) the micaceous starting material is partially dehydrated through heating up to 800° C.;

(b) the particles are run into a liquid to subdivide the particles;

(c) the liquid is removed and a mica pulp formed;

(d) the mica pulp is combined with water; and then (e) paper is made via hand methods or utilizing conventional papermaking machinery.

The patented improvement to that process which acts to increase the water resistance of and to strengthen the paper comprehends depositing an adhesive form of silica on the mica, this silica coming from a colloidal silica suspension or a solution containing hydrolyzed silicic acid esters.

U.S. Pat. No. 2,842,183 indicates that it is an improvement upon U.S. Pat. No. 2,614,055, supra, and discloses a three-step method:

(a) phlogopite, lepidolite, or, preferably, muscovite is fired at 750°-850° C. to partially dehydrate the material;

(b) the dehydrated material is run into an aqueous medium and agitated to comminute the mica into small particles or platelets, this aqueous medium containing barium ions which exchange with potassium ions in the surface of the mica; and then (c) the comminution is continued until a pulp-like suspension is formed.

The addition of the barium ions is asserted to impart higher tensile strength to the mica paper.

U.S. Pat. No. 2,914,107 also declares that it discloses an improvement upon U.S. Pat. No. 2,614,055, supra, and describes a four-step process:

(a) micaceous materials are heated to 700°-900° C. to delaminate the mica into fine particles;

(b) the fine particles are immersed into an aqueous medium and agitated therein to comminute the particles into small platelets;

(c) the so-formed slurry of comminuted mica platelets is contacted with an aqueous potassium silicate solution. Optionally, the potassium silicate solution may form the aqueous medium for step (b); and then (d) the resultant pulp-like suspension is formed into paper sheets.

The treatment in potassium silicate solution is asserted to improve the tensile strength and resistance to moisture of the paper.

U.S. Pat. No. 3,434,917 discusses a five-step method for producing paper from vermiculite:

(a) the vermiculite is run into an aqueous solution of NaCl;

(b) after removal from the NaCl bath, washing, and draining, the vermiculite is immersed into an aqueous solution of LiCl;

(c) after removal from the LiCl bath, washing, and draining, the vermiculite is immersed into water and agitated to form a suspension;

(d) a flocculating agent of KOH or HCl is added to the suspension; and then (e) the suspension is formed into paper.

U.S. Pat. No. 3,001,571 describes the preparation of tetrasilicic mica papers via a five-step method:

(a) the starting ingredients are fused to a homogeneous melt;

(b) the melt is cooled very slowly to a body containing large tetrasilicic mica crystals;

(c) the crystalline body is immersed into water to cause hydration and swelling of the mica accompanied with partial cleavage thereof;

(d) after removal from the water bath, the material is heated to 300°-500° C. to effect exfoliation along the basal cleavage planes thereby yielding thin, discrete, flexible platelets; and thereafter (e) the platelets are immersed into water in sufficient quantity to yield a suspension which can be formed into sheets of paper using conventional papermaking techniques.

United States Bureau of Mines Bulletin 647, *Fluorine Micas*, pages 236-242 (1969) discloses a seven-step method for preparing mica paper wherein a synthetic tetrasilicic fluormica produced via melting or solid state reactions constitutes the starting material:

(a) an aqueous dispersion is made of a water-swelling fluormica;

(b) large particles contained in the dispersion are removed through sedimentation followed by decantation;

(c) the decanted portion is subjected to cation exchange and flocculation utilizing a suitable reagent;

(d) the floc is washed and concentrated, preferably through vacuum filtering;

(e) the floc is homogenized via agitation;

(f) a film is cast onto a flat surface employing the doctor blade technique; and then (g) the film is slowly air dried at ambient or slightly elevated temperatures.

Synthesized lithium fluorhectorites prepared through melting or solid state reactions are disclosed as being especially suitable starting materials. Numerous cation exchanges are discussed with KCL yielding the best films. Exchanges of $Ba^{+2}$ and $Sr^{+2}$ ions with $Li^+$ ions are observed to have little effect upon dielectric strength, but flocculation with $Pb(NO_3)_2$ resulted in greatly improved dielectric strengths. The capability of hot pressing films is also observed.

DESCRIPTION OF THE PREFERRED EMBODIMENTS

Tables III-VI report several glass compositions, expressed in parts by weight on the oxide basis as calculated from the batch, illustrating the parameters of the instant invention. Since it is not known with which cation(s) in the glass the fluoride is combined, it is recorded simply as fluoride or in terms of the batch ingredient used in incorporating fluoride into the glass. Furthermore, because the sums of the batch components total or approximately total 100, for all practical purposes the batch constituents may be deemed to be present in terms of weight percent.

The actual batch ingredients can comprise any materials, either the oxides or other compounds, which, when melted together, will be converted into the desired oxide in the proper proportions. In the exemplary compositions listed in Tables III-VI, the batch materials consisted of such materials as sand, magnesia, magnesium fluoride, aluminum fluoride, and the carbonates of alkali or alkaline earth metals. The oxides of transition metals, cobalt nitrate, boric oxide, zircon, $P_2O_5$, PbO, and iron oxalate were used as respective sources, when required. The following melting procedure involved laboratory scale activity. It will be appreciated, of course, that the batches are amenable to commercial production in pots or continuous melting units.

The batches were ballmilled to improve the homogeneity of the melt and then run into platinum or silica crucibles. The crucibles were placed into a furnace operating at 1450° C. and maintained therewithin for five hours. The molten batches were not stirred and were kept covered to minimize loss of fluorine, chemically determined to be about 10-15%. The fluid and readily devitrifiable melts were formed as rolled ribbon except with Example 14 where variations in forming techniques were employed to investigate the effect of cooling history. With the more stable glass-forming compositions, slabs of glass about 0.5" in thickness were cast. Where the melts devitrified rapidly upon cooling, glass-ceramic bodies were prepared in accordance with the spontaneous formation method as described, e.g., in U.S. Pat. Nos. 3,985,534 and 3,985,531. The heat treatments required to convert the glasses to glass-ceramic bodies utilizing the conventional process for preparing glass-ceramics are also reported in Tables III-VI.

The glass-ceramic materials were immersed into deionized water and left to stand overnight. Stirring was employed occasionally with some compositions where the rate of swelling was slow. The swelled material was stirred, allowed to settle for about 10 minutes, and then decanted to eliminate residual glass and non-micaceous phases, if present. The decanted portion was thereafter evaporated to a viscosity of about 100 centipoises and stored until used in papermaking processes.

Tables III-VI also record the crystal phases present in the glass-ceramic materials, as identified via X-ray diffraction analyses, the completeness of gelation reaction, and the quality of paper formed when the gel was cast onto a glass surface and dried. Example 14 represents stoichiometric lithium fluorhectorite. The examples set forth in Table III reflect substitutions of various cations in the stoichiometric composition. Table IV provides examples of solid solution between fluorhectorite and other sheet or layer-lattice silicates. Table V reports papermaking compositions peripheral to stoichiometric fluorhectorite. Table VI lists glass compositions suitable for preparing hydrothermal water swelling mica glass-ceramics.

TABLE III

| | 1 | 2 | 3 | 4 | 5 | 6 | 7 | 8 | 9 | 10 |
|---|---|---|---|---|---|---|---|---|---|---|
| $SiO_2$ | 56.3 | 62.4 | 38.8 | 61.0 | 61.0 | 64.4 | 62.5 | 62.5 | 64.4 | 60.8 |
| MgO | 10.8 | 17.5 | 12.5 | 4.7 | 4.7 | 5.0 | 7.3 | 7.3 | 7.5 | 7.1 |
| $Li_2O$ | 6.0 | 1.3 | 3.2 | 7.6 | 7.6 | 8.0 | 7.8 | 7.8 | 8.0 | 7.6 |
| $MgF_2$ | 16.7 | 16.2 | 14.7 | 17.1 | 17.1 | 18.0 | 17.5 | 17.5 | 18.0 | 17.0 |
| $P_2O_5$ | 9.5 | — | — | — | — | — | — | — | — | — |
| $Na_2O$ | — | 2.7 | — | — | — | — | — | — | — | — |
| PbO | — | — | 24.0 | — | — | — | — | — | — | — |
| $B_2O_3$ | — | — | 7.5 | — | — | — | — | — | — | — |
| ZnO | — | — | — | 10.1 | — | — | — | — | — | — |
| NiO | — | — | — | — | 10.1 | — | — | — | — | — |
| $TiO_2$ | — | — | — | — | — | 5.0 | — | — | — | — |
| CoO | — | — | — | — | — | — | 4.9 | — | — | — |
| CuO | — | — | — | — | — | — | — | 4.9 | — | — |
| CdO | — | — | — | — | — | — | — | — | 2.5 | — |
| | — | — | — | — | — | — | — | — | — | 7.6 |
| Glass | Spontaneous Glass-Ceramic | Spontaneous Glass-Ceramic | Transparent | Opaline | Yellow-brown, Slight devit. | Nearly opaque | Deep blue, Slight devit. | Green | Marginal | Transparent |
| Glass-Ceramic Heat Treatment | — | — | 700° C. for 4 hours | 700° C. for 4 hours | 700° C. for 4 hours | 700° C. for 4 hours | 700° C. for 4 hours | 700° C. for 4 hours | 700° C. for 4 hours | 700° C. for 4 hours |
| Glass-Ceramic Appearance | — | — | Fine-grained, white | Fine-grained, white to brown | Fine-grained yellowish | White opaque | Black metallic skin, pink interior | Black metallic skin, yellow interior | Fine-grained, white | Fine-grained, white |
| Crystal Phases | Hectorite, Amphibole | Hectorite, Amphibole | Hectorite, Non-Swelling Mica | Hectorite, Quartz, Lithium disilicate | Hectorite, Quartz, Lithium disilicate | Hectorite, Quartz, Lithium disilicate | Hectorite, Quartz, Lithium disilicate | Hectorite, Quartz, Lithium disilicate | Hectorite, Quartz, Lithium disilicate | Hectorite |
| Gel | Gelled to rather coarse particles | Partly gelled | Completely gelled | Almost completely gelled | Almost completely gelled | Almost completely gelled | All gelled except skin | All gelled except skin | Completely gelled | Gelled in part |
| Paper Quality | Poor | Weak | Very smooth but weak | Very smooth but weak | Excellent | Excellent | Excellent | Excellent | Excellent | Weak but flexible |

| | 11 | 12 | 13 |
|---|---|---|---|
| $SiO_2$ | 61.4 | 64.1 | 63.7 |
| MgO | 7.4 | 10.8 | 10.7 |
| $Li_2O$ | 7.9 | 8.0 | 7.9 |
| $MgF_2$ | 17.7 | 14.5 | 12.4 |
| $TiO_2$ | — | 2.7 | 5.3 |
| $ZrSiO_4$ | 5.7 | — | — |
| Glass | Good | Good | Good |
| Glass-Ceramic Heat Treatment | 700° C. for 4 hours | 700° C. for 4 hours | 700° C. for 4 hours |
| Glass-Ceramic Appearance | Fine-grained, white | Fine-grained, brown-white | Fine-grained, brown-white |
| Crystal Phases | Hectorite, Lithium disilicate | Hectorite, Lithium disilicate | Hectorite, Lithium disilicate |
| Gel | Completely gelled | Partly gelled | Partly gelled |
| Paper Quality | Weak | Good smooth paper | Good smooth paper |

TABLE IV

| | 14 | 15 | 16 | 17 | 18 | 19 | 20 | 21 | 22 |
|---|---|---|---|---|---|---|---|---|---|
| $SiO_2$ | 64.4 | 61.0 | 63.3 | 63.0 | 62.4 | 61.8 | 62.3 | 62.1 | 62.3 |
| MgO | 10.8 | 15.3 | 16.0 | 13.1 | 16.5 | 14.6 | 17.3 | 18.1 | 14.7 |
| $Li_2O$ | 8.0 | — | 2.7 | 4.0 | 1.3 | 1.3 | 0.6 | — | 1.6 |
| $Na_2O$ | — | 7.8 | — | 2.6 | 2.6 | 5.3 | 2.6 | 1.8 | 3.9 |
| $MgF_2$ | 16.7 | 15.8 | 18.0 | 17.9 | 17.8 | 17.6 | 17.8 | 17.7 | 17.7 |
| Glass- | Transparent to opaline | Transparent to opalind | Spontaneous Glass- | Spontaneous Glass- | Spontaneous Glass- | Transparent | Spontaneous Glass- | Spontaneous Glass- | Spontaneous Glass- |
| Glass-Ceramic Heat Treatment | 700° C. for 4 hours | 700° C. for 4 hours | — | — | — | 700° C. for 4 hours | — | — | — |
| Glass-ceramic Appearance | Fine-grained | Fine grained | — | — | — | Fine-grained | — | — | — |
| Crystal Phases | Hectorite, Quartz Amphibole, Lithium disilicate | Amphibole, Cristobalite | Hectorite Amphibole Cristobalite | Hectorite | Hectorite | Hectorite | Hectorite Amphibole, Cristobalite | Amphibole, Hectorite, Tridymite | Hectorite |
| Gel | Almost completely gelled | Largely ungelled | Almost completely | Almost completely gelled | Almost completely gelled | No gel | Almost completely gelled | No gel | Partly gelled |
| Paper Quality | Excellent | None weak | Smooth but | Weak creasibility, | Poor | None paper | Good smooth | None smoothness, somewhat | Excellent weak |
| | | | | | powder on surface | | | | |

| | 23 | 24 | 25 | 26 | 27 | 28 | 29 | 30 |
|---|---|---|---|---|---|---|---|---|
| $SiO_2$ | 62.5 | 63.6 | 63.0 | 63.6 63.6 | 61.2 | 61.9 | 64.4 | 61.3 |
| MgO | 18.2 | 15.0 | 18.3 | 14.9 | 9.5 | 9.6 | 11.1 | 16.0 |
| $Li_2O$ | 0.5 | 3.2 | 1.1 | 3.8 | 3.8 | 4.6 | 7.2 | 3.9 |
| $Na_2O$ | 1.3 | — | — | — | 7.9 | 6.4 | — | 1.3 |
| $MgF_2$ | 17.9 | 18.1 | 18.0 | 18.1 | 18.1 | 17.4 | 18.1 | 17.5 |
| Glass- | Spon-Glass-Ceramic | Glass-Ceramic | Spontaneous Glass-Ceramic | Spontaneous Glass-Ceramic | Transparent to opaline | Transparent to opaline | Transparent to opaline | Spontaneous Glass-Ceramic |
| Glass-Ceramic Heat Treatment | — | — | — | — | 700° C. for 4 hours | 700° C. for 4 hours | 700° C. for 4 hours | — |
| Glass-Ceramic Appearance | — | — | — | — | Fine-grained, white | Fine-grained, white | Fine-grained, white | — |
| Crystal Phases | Hectorite, Cristobalite | Hectorite Amphibole Cristobalite | Hec-Cristobalite | Hectorite, Amphibole, Cristobalite | Mica, Amphibole | Hectorite, Lithium disilicate | Hectorite, Lithium amphibole | Hectorite, Amphibole, cristobalite |
| Gel | Almost completely gelled | Almost completely gelled | Almost completely gelled | Almost completely gelled | No gel | Swelled but tended to settle out | Completely gelled | Completely gelled |
| Paper Quality | Excellent smoothness, somewhat weak | Good, some powder on surface | Good, some powder on surface | Excellent | None | Only powder | Excellent | Excellent |

TABLE V

| | 31 | 32 | 33 | 34 | 35 | 36 | 37 | 38 |
|---|---|---|---|---|---|---|---|---|
| $SiO_2$ | 52.9 | 65.7 | 60.4 | 62.4 | 60.5 | 51.5 | 48.3 | 41.8 |
| $B_2O_3$ | — | — | — | — | — | 14.6 | 18.2 | 25.6 |
| $Al_2O_3$ | 6.0 | 6.0 | — | — | — | — | — | — |
| $AlF_3$ | — | 1.6 | — | — | — | — | — | — |
| MgO | 17.5 | — | 1.4 | 5.6 | 7.1 | 7.4 | 5.8 | 4.8 |
| $MgF_2$ | 15.5 | 17.1 | 17.9 | 18.1 | 18.3 | 19.9 | 20.7 | 22.2 |
| $Li_2O$ | 2.0 | 10.3 | 5.7 | 6.9 | 8.1 | 6.6 | 7.0 | 5.8 |
| $Na_2O$ | — | — | — | — | 2.1 | — | — | — |
| $Fe_2O_3$ | — | — | 15.7 | 7.6 | — | — | — | — |
| $P_2O_5$ | — | — | — | — | 4.8 | — | — | — |
| SrO | 6.1 | — | — | — | — | — | — | — |

TABLE V-continued

| Glass | Clear | Opaline | Spontaneous Glass-Ceramic | Spontaneous Glass-Ceramic | Opal | Opal, some fine devitrification | Opal | Opal |
|---|---|---|---|---|---|---|---|---|
| Glass-Ceramic Heat Treatment | 800° C. for 4 hours 1040° C. for 4 hours | 700° C. for 4 hours 850° C. for 4 hours | — | — | 700° C. for 4 hours | 700° C. for 10 hours | 700° C. for 6 hours | 700° C. for 6 hours |
| Glass-Ceramic Appearance | Fine-grained white | Fine-grained white | Fine-grained black | Fine-grained gray | Fine-grained white | Fine-grained white | Fine-grained white | Fine-grained white |
| Crystal Phases | Water swelling mica | Water swelling mica, beta-spodumene | Water swelling mica, magnetite | Water swelling mica, | Water swelling mica | Water swelling mica, glass | Water swelling mica, glass | Water swelling mica, glass |
| Gel | Essentially completely gelled | Essentially completely gelled | Essentially completely gelled | Essentially completely gelled | Essentially completely gelled | Essentially completely gelled | Essentially completely gelled | Essentially completely gelled |
| Paper Quality | Dull-surface, flexible, weak | Satin-finish, flexible, creasible, strong | Flexible, gray-black magnetite | Flexible, gray, | Slightly flexible, white | Flexible, white | Flexible, creasible, white | Somewhat brittle, white, sticks to glass |

| | 39 | 40 | 41 | 42 |
|---|---|---|---|---|
| SiO$_2$ | 49.3 | 62.9 | 64.4 | 48.3 |
| B$_2$O$_3$ | 18.2 | 6.0 | — | 9.4 |
| MgO | 9.8 | 12.5 | 10.0 | 20.5 |
| MgF$_2$ | 15.7 | 15.1 | 18.1 | 18.4 |
| Li$_2$O | 7.0 | 3.5 | 6.4 | 4.0 |
| Na$_2$O | — | — | 3.3 | — |
| Glass | Opal | Opal | Clear | Spontaneous Glass-Ceramic |
| Glass-Ceramic Heat Treatment | 700° C. for 6 hours | 800° C. for 2 hours | 800° C. for 2 hours | 800° C. for 2 hours 900° C. for 1 hour |
| Glass-Ceramic Appearance | Fine-grained, white | Fine-medium grained | Fine-grained, white | Fine-grained, white |
| Crystal Phases | Water swelling mica, glass | Water swelling mica, glass | Water swelling mica, glass | Boron fluorphlogopite, Magnesium fluorborate |
| Gel | Essentially completely gelled | Essentially completely gelled | Essentially completely gelled | Essentially completely gelled |
| Paper Quality | Flexible, white, sticks to glass, soapy feel | Flexible, translucent, sticks to glass but released by KCl solution during exchange | Smooth, flexible, somewhat weak | Excellent |

TABLE VI

| | 43 | 44 | 45 | 46 | 47 | 48 | 49 | 50 | 51 | 52 |
|---|---|---|---|---|---|---|---|---|---|---|
| SiO$_2$ | 65.4 | 65.2 | 65.0 | 64.8 | 66.0 | 65.4 | 62.5 | 64.8 | 64.9 | 66.1 |
| MgO | 22.0 | 23.1 | 24.3 | 25.4 | 27.6 | 22.0 | 21.3 | 25.4 | 21.8 | 22.2 |
| Li$_2$O | 4.1 | 3.2 | 2.3 | 1.4 | 2.1 | 5.1 | 5.8 | 2.4 | 8.1 | 8.3 |
| Na$_2$O | 8.5 | 8.5 | 8.4 | 8.4 | 4.3 | 6.5 | 4.3 | 6.4 | — | — |
| F | — | — | — | — | — | — | 5.1 | — | 5.2 | 3.4 |
| Glass | Clear | Clear | Clear, some edge devitrification | Clear, some edge devitrification | Clear, some edge devitrification | Clear, some haze | Opal | Clear, some edge devitrification | Opal, some edge devitrification | Translucent opal |
| Hydrothermal Treatment | 300° C., 16 hours, 1250 psig steam | 300° C., 16 hours, 1250 psig steam | 300° C., 16 hours, 1250 psig steam | 300° C., 16 hours, 1250 psig steam | 300° C., 16 hours, 1250 psig steam | 300° C., 32 hours, 1250 psig steam | 300° C., 32 hours, 1250 psig steam | 300° C., 32 hours, 1250 psig steam | 300° C., 32 hours, 1250 psig steam | 300° C., 32 hours, 1250 psig steam |
| Crystal Phases | Water swelling mica | Water swelling mica | Water swelling mica, makes thixotropic gel | Water swelling mica, makes thixotropic gel | No reaction | Water swelling mica | Water swelling mica | Water swelling mica | Water swelling mica | Water swelling mica |
| Paper or Film Quality | Brittle, sticks to glass | Brittle, sticks to glass | Brittle, sticks to glass | Brittle, sticks to glass | Somewhat brittle, sticks to glass | Somewhat brittle, sticks to glass | Flexible but not creasible | Somewhat brittle, sticks to glass | Somewhat brittle, sticks to glass | Somewhat brittle, sticks to glass |
| Heat Treatment | 800° C. | 800° C. | 800° C. | 800° C. | 800° C. | 800° C. | 800° C. | 800° C. | 800° C. | 800° C. |

TABLE VI-continued

| for Glass-Ceramic | for 2 hours 1000° C. for 4 hours | for 2 hours 1000° C. for 4 hours | for 2 hours 1000° C. for 4 hours | for 2 hours 1000° C. for 4 hours | for 2 hours 1000° C. for 4 hours | for 2 hours 1000° C. for 4 hours | for 2 hours 1000° C. for 4 hours | for 2 hours 1000° C. for 4 hours | for 2 hours 1000° C. for 4 hours | for 2 hours 1000° C. for 4 hours |
|---|---|---|---|---|---|---|---|---|---|---|
| Glass-Ceramic Appearance | Surface nucleated, columnar crystallization | Surface nucleated, columnar crystallization | Surface nucleated, columnar crystallization | Surface nucleated, columnar crystallization | Surface nucleated columnar crystallization | Surface nucleated, spherulitic interior | Fine-grained | Surface nucleated, spherulitic interior | Fine-grained | Fine-grained |
| Hydrothermal Treatment | 300° C. for 32 hours, 1250 psig steam | 300° C. for 32 hours, 1250 psig steam | 300° C. for 32 hours, 1250 psig steam | 300° C. for 32 hours, 1250 psig steam | 300° C. for 32 hours, 1250 psig steam | 300° C. for 32 hours, 1250 psig steam | 300° C. for 32 hours, 1250 psig steam | 300° C. for 32 hours, 1250 psig steam | 300° C. for 32 hours 1250 psig steam | 300° C. for 32 hours, 1250 psig steam |
| Crystal Phases | Water swelling mica | Water swelling mica | Water swelling mica, makes thixotropic gel | Water swelling mica, makes thixotropic gel | Water swelling mica lath-like phase (biopyrobole?) | Water swelling mica | Water swelling mica | Water swelling mica | Water swelling mica | Water swelling mica |
| Paper Quality | Brittle, sticks to glass | Brittle, sticks to glass | Brittle, sticks to glass | Brittle, sticks to glass | White, smooth, flexible, stable above 500° C. | Somewhat brittle, sticks to glass | Flexible | Flexible, sticks to glass | Flexible, somewhat brittle when folded | Flexible, somewhat brittle when folded |

| | 53 | 54 |
|---|---|---|
| $SiO_2$ | 61.0 | 64.0 |
| MgO | 22.5 | 32.0 |
| $Li_2O$ | 2.0 | — |
| $Na_2O$ | 4.5 | 4.0 |
| CoO | 10.0 | — |
| Glass | Dark blue | Clear, some edge devitrification |
| Hydrothermal Treatment | 300° C., 16 hours 1250 psig steam | 300° C., 16 hours 1250 psig steam |
| Crystal Phases | Pink water-swelling mica makes thixotropic gel | Water swelling mica only on glass surface |
| Paper or Film Quality | Flexible, sticks to glass | Insufficient mica to form paper |
| Heat Treatment for Glass-ceramic | 800° C. for 2 hours 1000° C. for 4 hours | 800° C. for 2 hours 1000° C. for 4 hours |
| Glass-Ceramic Appearance | Surface nucleated, spherulitic interior | Surface nucleated, columnar crystallization |
| Hydrothermal Treatment | 300° C. for 32 hours 1250 psig steam | 300° C. for 32 hours 1250 psig steam |
| Crystal Phases | Water-swelling pink mica | Water-swelling mica |
| Paper Quality | Flexible and creasible | Smooth, brittle, sticks to glass |

As can be seen from the above examples, the crystals developed must have the capability of swelling when contacted with water. A comparison of Examples 14 and 15 is especially appropriate here. Example 15, the sodium analog of the lithium fluorhectorite of Example 14, did not swell in water and did not yield a paper. Furthermore, as has been explained above, the size and morphology of the crystals are of importance in the quest for strong, flexible, and creasible paper. For example U.S. Pat. No. 3,001,571, supra, discloses slowly cooling sodium fluorhectorite to platelets of about 10 Å–100 Å thickness having a 100–1000:1 diameter: thickness ratio. In contrast, examination via electron microscopy of the fluorhectorite paper prepared in accordance with the present inventive method, where a glass-ceramic body constitutes the precursor material, determined the presence of interwoven ribbons and/or strips having a rectangular-like geometry with typical dimensions of about 0.5–10 microns in length, about 500–5000 Å in width, and less than about 100 Å in cross section. These sometimes appear to group together to form a composite or patchwork structure. Laboratory study has indicated that the use of glass-ceramic bodies as precursor materials insures that such morphology is obtained. This phenomenon is illustrated by the fact that where the melt of Example 14 was cooled slowly in a crucible, thereby producing large spherulites of lithium fluorhectorite, the paper made therefrom was of poor quality which, in electron microscopy, exhibited only large rectangular plates and some lath-shaped particles of low aspect ratio.

Sodium fluorhectorite flakes were produced in accordance with the method of U.S. Pat. No. 3,001,571, supra. Those flakes, some having diameters of up to two centimeters, would not gel when immersed into water at room temperature, even after several weeks of such exposure. Electron micrographs of the material failed to reveal the long strip and/or ribbon-like morphology typical of the products of the instant invention. Papers made from the flakes did not demonstrate the strength, flexibility, and creasibility of the present inventive papers.

Certain electron micrographs of naturally-occurring hectorite have exhibited randomly oriented, fibrous units several microns in length and less than 2000 Å wide, rather than the sheets typical of most micas. However, the fibers do not show an overlapping texture with numerous regions of parallel or subparallel development, and do not grow together to form composite flakes. Paper made from natural hectorite in accordance with the instant inventive method is brittle, this brittleness being deemed to be the result of (a) the difference in crystal morphology existing between the crystals therein and the overlapping strips and/or ribbons used in the present method, and (b) the impure state of natural hectorite, i.e., the material is an intimate mixture of hectorite, silica, and other fine-grained, clay-like materials.

The degree of lamination exhibited by the inventive papers, fibers, films, and boards is dependent upon the solid:liquid ratio of the film-forming slurry employed as well as the method utilized for making it. For example, paper prepared by film casting a gel of Example 14 containing about 2–3% solids appeared to demonstrate the most ideal properties of smoothness, strength, flexibility, and creasibility. Thicker gels, viz., 10–20% solids, exhibited relatively poorer lamination. Accordingly, whereas papers can be prepared from gels containing between about 1–50% solids, it is much preferred to maintain the solids content between about 2–25%. As has been observed above, deflocculating or peptizing agents can be added to control and modify the flow properties, i.e., the viscosity, of the gel.

Paper drawn from the interface between the gel and a solution of large cations, e.g., KCl or $KC_2H_3O_2$, demonstrates more flexibility than paper formed via film casting. Such improved flexibility is believed to be derived from better lamination. In contrast, paper prepared by doctor blading preflocculated lithium fluorhectorite gel is brittle and has a porous surface, thereby signifying poor lamination.

As has been observed earlier, solids' contents up to as great as 80% by weight may be operable where, for example, fibers are to be produced through a high pressure extrusion technique or boards are to be formed through a semi-dry pressing process.

Microscopic examination of several film cast papers disclosed many tiny pinholes and bubbles therein. These seem to occur most often during drying (particularly in well-decanted gels) and are conjectured to be the result of a non-porous skin developing which inhibits the gel from breathing. These defects have been observed even where the gel was subjected to a partial vacuum before pouring. Accordingly, their source is surmised to be surface-adsorbed or trapped air.

Occasionally, tiny globular particles are observed to collect on the side exposed to the air of a film cast paper. One explanation of their occurrence is as a result of precipitation of a lithium salt during drying. The globules can be easily rubbed off like sandy particles, but leave minute structural defects on the paper surface.

Papers prepared via film casting lithium and/or sodium-containing fluorhectorite gels produced from glass-ceramics can vary from nearly transparent to white opaque and the surface can range from smooth on both sides to rather rough on the surface exposed to air. Flexibility runs the gamut from those which crack upon creasing to some which can be creased many times like conventional wood pulp paper. In general, the more non-uniformity in thickness of the particle size, the more brittleness demonstrated by the paper.

Table VII lists the properties of a film cast paper prepared from glass-ceramic Example 14 exchanged with $Ca^{+2}$ and $K^+$ ions. Caution must be exercised in examining the values reported there since the paper may be subject to the structural defects described above. To provide a comparison, similar properties of a commercial writing paper containing 25% cotton were also measured and these are included in Table VII. It is believed that the tensile strength of the inventive papers (measured here simply on cut strips with no edge protection) can be improved by eliminating defects therein along with increasing the aspect ratio for partial entanglement or intertwining of the strips and/or ribbons. The tear and wet strengths are relatively poor for nearly all film cast papers. Incorporating 10–30% by weight glass fiber (2–20 micron diameter) into film cast paper of Example 14 illustrated that (a) the wet and tear strength was substantially increased; (b) the elastic modulus was enhanced up to three times; and (c) the tensile strength remained practically unaffected. The film cast papers manifest little or no porosity across the surface when tested with a surface wetting dye. Lamellar porosity, however, was measured at 37% and 72% for thin and thick papers, respectively, the pore size ranging from about 10 microns down.

When heated rapidly, the conversion of interstitial water to steam causes blisters in the paper. Nevertheless, when heated slowly, the paper can survive temperatures up to at least 600° C. without losing much flexibility. Some of the transparent papers take on a metallic, silvery luster under reflected light, while still retaining transparency, when heated to 300° C. and higher. Moisture pickup when cooled to room temperature may range up to about 7% by weight, depending upon porosity and composition, the $K^+$ and $Ba^{+2}$ exchanged specimens being the least hygroscopic. The papers prepared from glass-ceramics of Example 14 exhibit good chemical and electrical resistance.

TABLE VII

| | $Ca^{+2}$ Exchanged Paper | $K^+$ Exchanged Paper | Writing Paper |
|---|---|---|---|
| Tensile strength at ~23° C. (psi) | 1300 | 2400 | 2950 |
| Tensile Strength After 1 hour at 500° C. (psi) | 500 | — | Incipient charring at 300° C. |
| Elastic Modulus (× 10 psi) | 0.25 | 0.27 | 0.31 |
| Porosity | 37–72% | 71.5 | 56 |
| Skeletal Density (g/cc) | 2.5 | — | 1.9 |
| Thermal Stability | >600° C. | >500° C. | Incipient charring at 300° C. |
| Moisture Pickup After Firing to 300° C. | ~7% | 1.4% | Incipient charring |
| Log ρ 300° C. | 11.37 | 8.8 | Incipient charring |
| Loss Tangent at 1KC (300° C.) | 0.27 | 0.6 | Incipient charring |
| Dielectric Constant at 1KC (300° C.) | 9.96 | 30 | Incipient charring |

The following description provides another specific embodiment of the inventive method. The process, which yields paper of excellent flexibility and creasibility, contemplates nine steps:

(1) place 25 grams of Example 40 as a glass-ceramic in 500 ml distilled water and maintain therein at room temperature for 16 hours;

(2) blend one minute in Waring Blendor (no load speed of 23,000 rpm);

(3) treat in autoclave for six hours in a saturated steam atmosphere at 120° C. and a steam pressure of 28 psig;

(4) add 100 mil distilled water to improve gel flow and again blend one minute in Waring Blendor;

(5) cast gel to form a film on the surface of a ceramic sheet;

(6) air dry the gel for two days;

(7) pour aqueous 1 N KCl solution onto dried gel film and let soak 0.5 hour;

(8) peel film off ceramic sheet, rinse in distilled water, and dry at 80° C. for 16 hours;

(9) heat the dried film (paper) to 100° C., hold 20 minutes, heat to 200° C., hold 20 minutes, heat to 300° C., hold 20 minutes, heat to 500° C., hold for two hours, and then cool to room temperature.

Tensile strengths up to 4500 psi have been measured on papers having very similar compositions when treated in substantial accordance with the above process.

In summary, stable gels have been prepared from materials containing lithium fluorhectorite and solid solutions thereof or their hydroxyl equivalents. Inorganic coatings, films, fibers, and papers utilizing glasses and/or glass-ceramics as starting materials have been produced from such gels within the general precursor composition range, expressed in weight percent on the oxide basis, of 0–12% $Li_2O$, 0–10% $Na_2O$, 0.5–14% $Li_2O+Na_2O$, 10–38% MgO, 0–30% $B_2O_3$, 0–10% $Al_2O_3$, 35–70% $SiO_2$, 0–15% OH, 0–15% F, and 4–15% F+OH. Up to about 30% total of such oxides as CaO, CoO, FeO, $Fe_2O_3$, MnO, NiO, PbO, $P_2O_5$, SrO, $TiO_2$, $ZrO_2$ and ZnO may be included to alter the physical properties of the basic $R_2O$-MgO-$SiO_2$-F and/or OH quaternary. (Where a hydroxyl equivalent of a fluorhectorite constitutes the predominant crystal phase, no fluoride is necessary although its presence can be tolerated. Where a fluorhectorite constitutes the desired crystal phase, at least 5% fluoride is normally required.) Where trisilicic micas are desired, the precursor glasses and/or glass-ceramics will have compositions consisting essentially, expressed in weight percent on the oxide basic, of 0–6% $Li_2O$, 0–9% $Na_2O$, 0.5–10% $Li_2O+Na_2O$, 20–38% MgO, 2–10% $B_2O_3$, 0–10% $Al_2O_3$, 4–12% $Al_2O_3+B_2O_3$, 35–56% $SiO_2$, 0–12% F, 0–12% OH, and 4–12% F+OH. In the case of trisilicic fluor-micas, at least 4% F and at least 0.5% $Li_2O$ will be present.

Papers have been made from similar compositions utilizing the casting techniques described in U.S. Pat. No. 3,001,571 and United States Bureau of Mines Bulletin 647, supra, but not only is the instant inventive different in method from those described in those publications, but the morphology of the particles making up the papers are uniquely dissimilar. The inventive papers contain overlapping and/or intertwined ribbons and/or strips of a micaceous crystal, often in subparallel regions forming composite structures instead of only the essentially uniform flakes, platelets, or books which result from those casting processes.

The all-around preferred inventive materials are glass-ceramics and hydrothermally treated glasses and glass-ceramics having compositions consisting essentially, by weight on the oxide basis, of about 0.5–10% $Li_2O$ and/or 2–10% $Na_2O$, 0.5–14% $Li_2O+Na_2O$, 15–32% MgO, 50–70% $SiO_2$, 0–5% $Al_2O_3$, 0–10% $B_2O_3$, and 0–12% F. The optimum composition is believed to approximate stoichiometric lithium fluorhectorite ($LiMg_2LiSi_4O_{10}F_2$) and solid solutions between that composition and $Li_{0.5}Mg_{2.75}Si_4O_{10}F_2$ or more MgO-rich stoichiometries, e.g., $Li_{0.5}Mg_3Si_{2.75}Mg_{0.25}O_{10}F_2$. The lithium fluorhectorite gels are capable of forming a continuous skin when contacted with salt solutions of large cations such as $K^+$, $Rb^+$, $Cs^+$, $Cu^+$, $Ag^+$, $NH_4^+$, $Ba^{+2}$, $Ca^{+2}$, $Sr^{+2}$, and $Pb^{+2}$, with $K^+$ and $Ba^{+2}$ being preferred. That phenomenon permits a continuous drawing process for films or fibers. Cation exchange to stop subsequent water swelling is essentially instantaneous with lithium fluorhectorite in aqueous gel suspension, but requires about 15 minutes for a formed paper. The exchange reaction causes $Li^+$ and/or $Na^+$ from the interlayer to be substantially replaced with the larger cations.

The preferred ion exchange reaction involves the use of potassium salt solutions such that $Li^+$ and/or $Na^+$ ions from the precursor water-swelling mica are partially replaced with $K^+$ ions to yield a potassium mica. The resultant paper, film, fiber, or board after washing and drying will have a composition, expressed in weight percent on the oxide basis, of about 3–17% $K_2O$, 0–8% $Li_2O$, 0–5% $Na_2O$, 10–38% MgO, 0–30% $B_2O_3$, 0–10% $Al_2O_3$, 35–70% $SiO_2$, 0–15% F, 0–15% OH, and 4–15% F+OH.

Where the inorganic papers, fibers, films, or boards are prepared from precursor lithium and/or sodium water-swelling trisilicic micas selected from the group of boron fluorphlogopite, hydroxyl boron phlogopite, and solid solutions between those and between those and other structurally-compatible species selected from the group of fluorhectorite, hydroxyl hectorite, talc, fluortalc, phlogopite, and fluorphlogopite, the preferred ion exchange reaction again contemplates the partial replacement of $Li^+$ and/or $Na^+$ ions with $K^+$ ions to produce a potassium mica. After washing and drying, the products will have a composition, expressed in weight percent on the oxide basis, of about 3–16% $K_2O$, 0–4% $Li_2O$, 0–5% $Na_2O$, 20–38% MgO, 2–10% $B_2O_3$, 0–10% $Al_2O_3$, 35–56% $SiO_2$, 0–12% F, 0–12% OH, and 4–12% F+OH.

Figure 4:
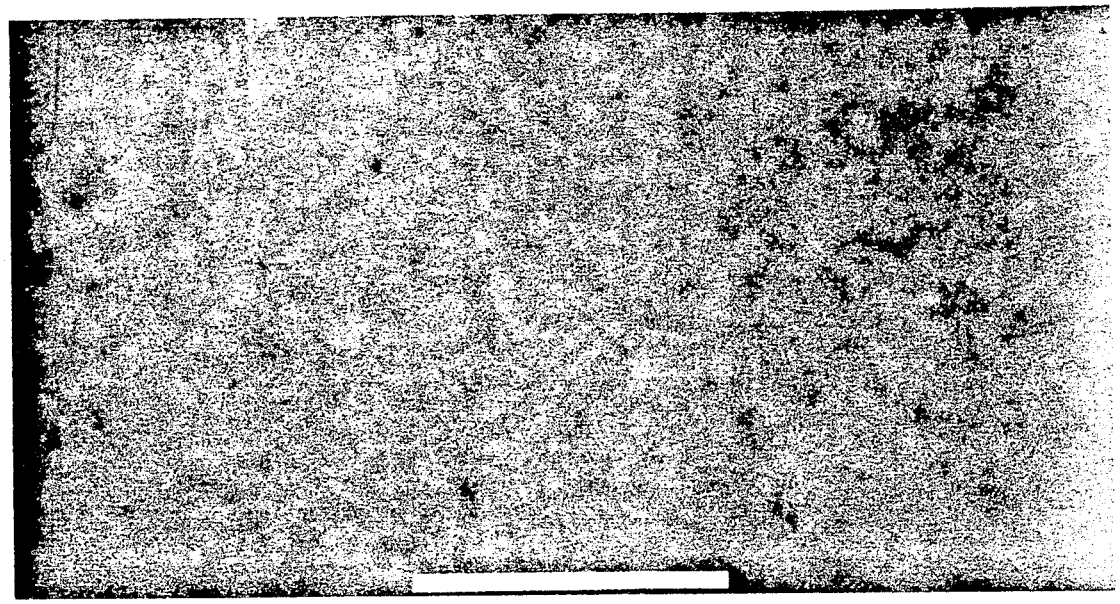
FIG. 4 is a transmission electron micrograph prepared of a gel used to make film made in accordance with the inventive process.

FIGS. 4–8 illustrate the strip and/or ribbon-like morphology of at least a substantial proportion of the crystals of an unexchanged (FIG. 4) and $K^+$ ion exchanged (FIGS. 5–8) lithium fluorhectorite present in the inventive papers. In the case of FIG. 4, the gel was merely dried for direct observation with a transmission electron microscope. In the cases of FIGS. 5–8, the gel was cast onto a glass surface, dried to yield a film or paper, and the film or paper then ion exchanged ($K^+$ for $Li^+$) in 2 N KCl solution and again dried for examination via the electron microscope replica technique.

FIG. 4 is a transmission electron micrograph displaying the elongated strip morphology exhibited by the crystals in a gel prepared from Example 14 produced as set forth in Table IV.

Figure 5:
FIG. 5 is a scanning electron micrograph focussed on an edge of paper prepared in accordance with the inventive process.

FIG. 5 is a scanning electron micrograph focused on the edge of a paper prepared from Example 14 made in accordance with the description in Table IV which illustrates the thicknesses of the composite or patchwork structures produced by the grouping together of the strips and/or ribbons. It is of interest to note the rough and jagged appearance of the layers and the arrows point out individual ribbons projecting from a layer.

Figure 6:
FIG. 6 is a replica electron micrograph prepared of a film made in accordance with the inventive process.

FIG. 6 is a replica electron micrograph of a paper prepared from Example 14 in accordance with the description in Table IV. The arrows direct attention to the overlapping and interweaving of the ribbon-like crystals.

Figure 7:
FIG. 7 is another replica electron micrograph prepared of a film made in accordance with the inventive process.

FIG. 7 is a replica electron micrograph of a paper prepared from Example 14 in accordance with the description in Table IV. The arrows direct attention to the ribbons projecting from a torn edge of a composite structure of overlapping or intertwining strips and/or ribbons which has been bent back over the original paper.

Figure 8:
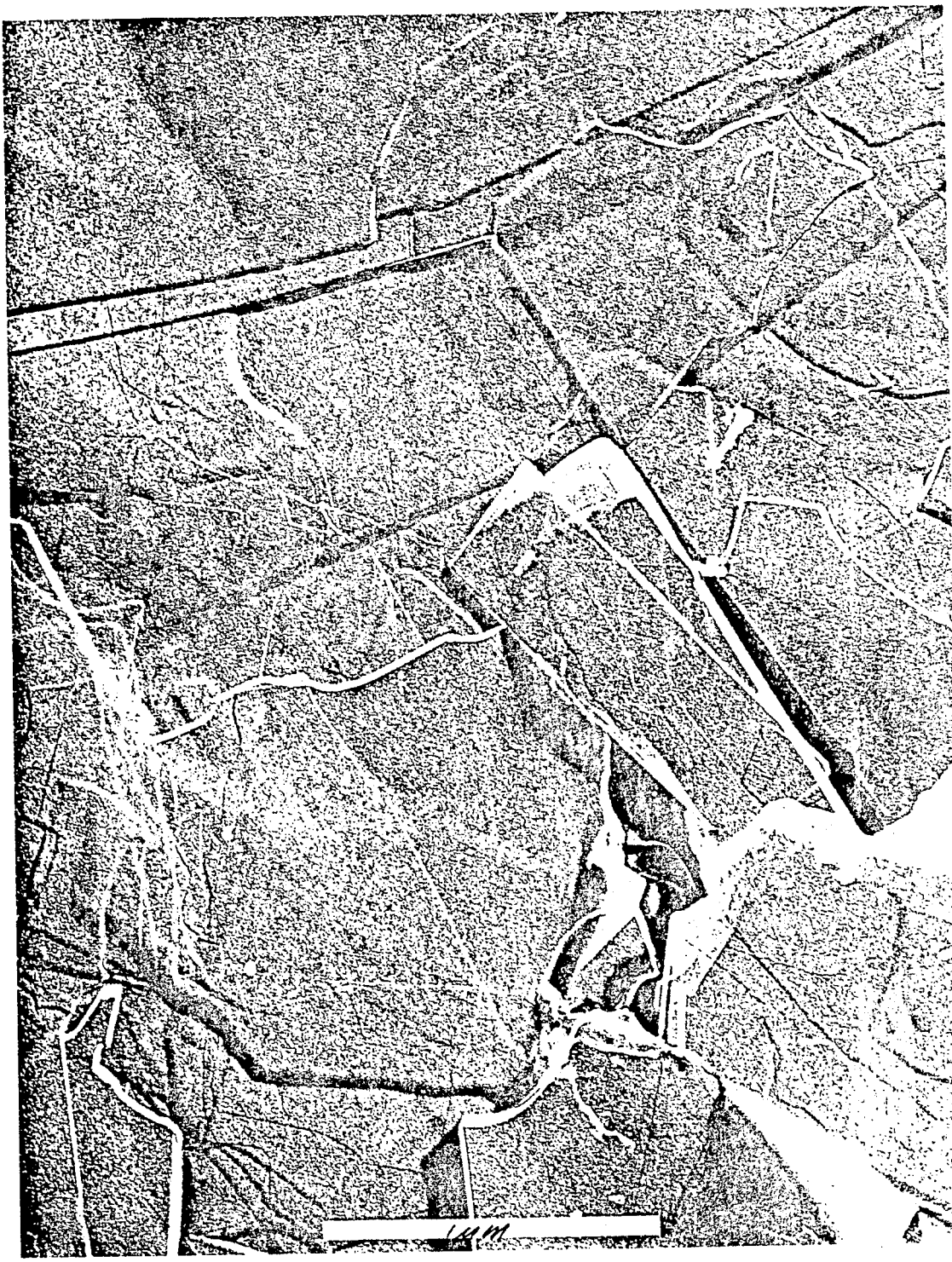
FIG. 8 is yet another replica electron micrograph prepared of a film made in accordance with the inventive process.

FIG. 8 is a replica electron micrograph of a paper prepared from Example 41 in accordance with the description in Table 5 which illustrates the rectangular-like strips frequently encountered in the inventive products.

In each of FIGS. 4–8, the white bar at the base of the photograph represents a distance of one micron.

We claim:

1. Inorganic gels containing a polar liquid and relatively uniformly-sized crystals consisting essentially of a lithium and/or sodium water-swelling mica selected from the group of fluorhectorite, hydroxyl hectorite, boron fluorphlogopite, hydroxyl boron fluorphlogopite, and solid solutions among those and between those and other structurally-compatible species selected from the group of talc, fluortalc, polylithionite, fluorpolylithionite, phlogopite, and fluorphlogopite, at least a substantial portion of said crystals exhibiting a morphology of a continuum of flakes, rectangular-like strips, and interwoven ribbons in parallel or sub-parallel zones or sheaths with said strips and ribbons being about 0.5–10 microns long, about 500 Å–5000 Å wide, and less than about 100 Å thick, and said flakes being irregularly shaped with diameters between about 0.5–10 microns and cross sections of less than about 100 Å.

2. Inorganic gels according to claim 1 also containing inert fillers such that the total of the solids portion of said gels and said inert fillers ranges up to 95% by volume.

3. Inorganic gels according to claim 2 wherein said fillers are selected from the group of clays, barite, talc, graphite, gypsum, and organic polymers.

4. A method for preparing inorganic gels containing relatively uniformly-sized crystals consisting essentially of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, which consists in the steps of:

(a) forming a glass-ceramic body containing relatively uniformly-sized crystals consisting essentially of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite;

(b) contacting said body with a polar liquid for a time sufficient to cause swelling and disintegration thereof accompanied with the formation of a gel, at least a substantial portion of the crystals in said gel exhibiting a morphology of a continuum of flakes, rectangular-like strips, and interwoven ribbons in parallel or sub-parallel zones or sheaths with said strips and ribbons being about 0.5–10 microns long, about 300 Å–5000 Å wide, and less than about 100 Å thick, and said flakes being irregularly shaped with diameters between about 0.5–10 microns and cross sections of less than about 100 Å; and then (c) adjusting the solid:liquid ratio of said gel to a desired fluidity.

5. A method according to claim 4 wherein said polar liquid is water.

6. A method according to claim 4 wherein said time sufficient to effect swelling, disintegration, and gelation ranges between about 1–48 hours.

7. A method according to claim 4 wherein the viscosity of said gel is adjusted by adding a deflocculating or peptizing agent thereto.

8. A method according to claim 4 wherein said gels also contain inert fillers such that the total of the solids portion of said gels and said inert fillers ranges up to 95% by volume.

9. A method according to claim 8 wherein said fillers are selected from the group of clays, talc, barite, graphite, gypsum, and organic polymers.

* * * * *

UNITED STATES PATENT AND TRADEMARK OFFICE
CERTIFICATE OF CORRECTION

PATENT NO. : 4,297,139

Page 1 of 3

DATED : October 27, 1981

INVENTOR(S) : George H. Beall et al.

It is certified that error appears in the above-identified patent and that said Letters Patent is hereby corrected as shown below:

Column 2, line 9, change "0.5-0.8" to --0.5-0.8Å--.

Column 2, line 34, change "thereform" to --therefrom--.

Column 2, line 66, change the comma to a period.

Column 3, line 47, change "2", first occurrence, to --3--.

Column 10, line 40, change "$Mg+^2 \rightleftarrows 2Li^{30}$" to --$Mg+^2 \rightleftarrows 2Li^+$--.

Column 14, line 22, "Li-end-" should read --Li end--.

Column 14, line 35, "Na-end-mem-" should read --Na end mem- --.

Column 14, line 48, "high-Li-" should read --high $Li^+$--.

Column 17, line 2, "$Si_4O_{10}F_2-NaMg2.5Li_{0-1}Si_4O_{10}F_2$)" should read --$Si_4O_{10}F_2-NaMg_{2-2.5}Li_{0-1}Si_4O_{10}F_2$)--.

Column 20, line 11, "$NaMg_2LiSi_4O_{10}(OH)_2-Na_{0.5}Mg_{2.5}Li_{0.5}Si_4O_{10}(OH)_2$" should read --$NaMg_2LiSi_4O_{10}(OH)_2-Na_{0.5}Mg_{2.5}Li_{0.5}Si_4O_{10}(OH)_2$--.

UNITED STATES PATENT AND TRADEMARK OFFICE
CERTIFICATE OF CORRECTION

PATENT NO. : 4,297,139

DATED : October 27, 1981

INVENTOR(S) : George H. Beall et al.

It is certified that error appears in the above-identified patent and that said Letters Patent is hereby corrected as shown below:

Column 20, line 39, "$Li^{30}$" should read --$Li^{+}$--.

Column 21, line 59, "0-20%" (second occurrence), should read --0-10%--.

Column 22, line 52, "$Ba^{30}$" should read --$Ba^{+}$--.

Column 23, line 56, "coarselycrystallized" should read --coarsely crystallized--.

Column 24, line 19, change "$Li^{30}$" to --$Li^{+}$--.

Column 31, line 41, under Example 23, change "Spon-" to --Spontaneous--.

Column 31, line 41, under Example 24, insert --Spontaneous--.

Column 31, line 42, under Example 23, remove "Glass-".

UNITED STATES PATENT AND TRADEMARK OFFICE
CERTIFICATE OF CORRECTION

PATENT NO. : 4,297,139

DATED : October 27, 1981

INVENTOR(S) : George H. Beall et al.

It is certified that error appears in the above-identified patent and that said Letters Patent is hereby corrected as shown below:

Column 31, line 48, change "ment" to --Treatment--.

Column 31, line 56, under Example 25, remove "lite".

Column 31, line 64, under Example 25, insert "on".

Signed and Sealed this

Fourteenth Day of August 1984

[SEAL]

Attest:

GERALD J. MOSSINGHOFF

*Attesting Officer*    *Commissioner of Patents and Trademarks*